US008949396B2

(12) United States Patent
Yoshinobu et al.

(10) Patent No.: US 8,949,396 B2
(45) Date of Patent: Feb. 3, 2015

(54) COMPUTER-READABLE STORAGE MEDIUM HAVING DISPLAY CONTROL PROGRAM STORED THEREIN, DISPLAY CONTROL DEVICE, AND DISPLAY CONTROL SYSTEM

(75) Inventors: Tomoaki Yoshinobu, Kyoto (JP); Hideki Fujii, Kyoto (JP); Shunsaku Kato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1137 days.

(21) Appl. No.: 12/510,482

(22) Filed: Jul. 28, 2009

(65) Prior Publication Data

US 2010/0093442 A1    Apr. 15, 2010

(30) Foreign Application Priority Data

Oct. 14, 2008  (JP) ................................. 2008-265553

(51) Int. Cl.
*G06F 15/16* (2006.01)
*G06F 15/173* (2006.01)
*A63F 13/30* (2014.01)

(52) U.S. Cl.
CPC ........... *A63F 13/12* (2013.01); *A63F 2300/535* (2013.01); *A63F 2300/5546* (2013.01); *A63F 2300/572* (2013.01)
USPC ............................ 709/223; 709/207; 705/319

(58) Field of Classification Search
CPC .... A63F 13/12; G06Q 10/103; G06Q 10/109; G06Q 50/01; G06Q 50/34; G07F 17/32; H04L 12/1813; H04L 12/581; H04L 29/06034; H04L 29/06414; H04L 29/06836; H04L 29/08936; H04L 29/12122
USPC ....................................................... 709/223
See application file for complete search history.

(56) References Cited

U.S. PATENT DOCUMENTS 7,441,034 B2 * 10/2008 Tsurusaki et al. ............. 709/227
7,574,493 B2 *  8/2009 Hutcheson et al. ........... 709/221
(Continued)

FOREIGN PATENT DOCUMENTS

| JP | 2003125366 | 4/2003 |
| JP | 2006254328 | 9/2006 |

(Continued)

OTHER PUBLICATIONS

"Xbox Live Tettei Gaido!!", Dorimaga in the issue of Jan. 31, 2003, vol. 2, Softbank Publishing Inc., Jan. 31, 2003, pp. 62-63 (Partial Translation—discussed at page 2 of the specification).
(Continued)

*Primary Examiner* — Melvin H Pollack
(74) *Attorney, Agent, or Firm* — Nixon & Vanderhye P.C.

(57) ABSTRACT

A game apparatus 3A includes: a registration information storage section 171 that stores pieces of individual information about game apparatuses 3 registered as communication partners, with which the game apparatus 3A communicates, and pieces of distinguishing information, about the game apparatuses 3, associated with the pieces of individual information; a connection determination section 101 that determines whether a game apparatus 3B, corresponding to one of the stored pieces of individual information, is connected to a server device 8; a first acquisition section 103 that acquires, when the game apparatus 3B is connected to the server device 8, a piece of individual information about a game apparatus 3C communicating with the game apparatus 3B; and a communication state display section 104 that visibly displays, based on the pieces of individual information, communication states of the game apparatus 3B and the game apparatus 3C associated with each other.

20 Claims, 18 Drawing Sheets

(56) References Cited

U.S. PATENT DOCUMENTS

| | | | |
|---|---|---|---|
| 7,613,782 B2* | 11/2009 | Nakajima et al. | 709/206 |
| 7,640,300 B2* | 12/2009 | Wohlgemuth et al. | 709/204 |
| 7,664,083 B1* | 2/2010 | Cermak et al. | 370/338 |
| 7,690,992 B2* | 4/2010 | Itou et al. | 463/31 |
| 7,818,392 B1* | 10/2010 | Martino et al. | 709/217 |
| 7,857,701 B2* | 12/2010 | Murphy et al. | 463/42 |
| 7,896,734 B2* | 3/2011 | Kaminkow et al. | 463/16 |
| 7,914,381 B2* | 3/2011 | Blythe et al. | 463/42 |
| 7,930,409 B2* | 4/2011 | Shitrit | 709/228 |
| 7,970,657 B2* | 6/2011 | Morgenstern | 705/26.1 |
| 7,997,987 B2* | 8/2011 | Johnson et al. | 463/42 |
| 8,007,362 B2* | 8/2011 | Aoyama et al. | 463/34 |
| 8,010,602 B2* | 8/2011 | Shen et al. | 709/204 |
| 8,019,875 B1* | 9/2011 | Nielsen | 709/227 |
| 8,028,020 B2* | 9/2011 | Huck et al. | 709/204 |
| 8,032,622 B2* | 10/2011 | Caspi et al. | 709/223 |
| 8,052,531 B2* | 11/2011 | Onuki et al. | 463/42 |
| 8,066,568 B2* | 11/2011 | O'Kelley et al. | 463/42 |
| 8,075,404 B2* | 12/2011 | Stamper et al. | 463/42 |
| 8,081,745 B2* | 12/2011 | Burrell et al. | 379/201.1 |
| 8,086,679 B2* | 12/2011 | Nobori et al. | 709/206 |
| 8,090,397 B2* | 1/2012 | Inagaki | 455/518 |
| 8,095,400 B2* | 1/2012 | Herde et al. | 705/5 |
| 8,095,890 B2* | 1/2012 | Sekimoto et al. | 715/811 |
| 8,108,462 B2* | 1/2012 | Morotomi | 709/204 |
| 8,167,722 B2* | 5/2012 | Beverly | 463/42 |
| 8,200,808 B2* | 6/2012 | Ishida | 709/224 |
| 8,285,312 B2* | 10/2012 | Rybak | 455/466 |
| 8,360,889 B2* | 1/2013 | Narita et al. | 463/42 |
| 8,416,184 B2* | 4/2013 | Morotomi et al. | 345/156 |
| 8,422,642 B2* | 4/2013 | Suito | 379/88.11 |
| 8,545,324 B2* | 10/2013 | Murase et al. | 463/40 |
| 8,549,179 B2* | 10/2013 | Kandregula et al. | 709/250 |
| 8,615,549 B2* | 12/2013 | Knowles et al. | 709/203 |
| 2006/0004874 A1* | 1/2006 | Hutcheson et al. | 707/104.1 |
| 2007/0266425 A1* | 11/2007 | Cho | 726/4 |
| 2008/0125226 A1* | 5/2008 | Emmerson | 463/42 |
| 2008/0140794 A1* | 6/2008 | Rybak | 709/207 |
| 2008/0268952 A1* | 10/2008 | Ikejiri et al. | 463/31 |
| 2009/0119737 A1* | 5/2009 | Perlman et al. | 725/133 |
| 2009/0221367 A1* | 9/2009 | Longley et al. | 463/32 |
| 2009/0239666 A1* | 9/2009 | Hall et al. | 463/42 |
| 2009/0264202 A1* | 10/2009 | Chen et al. | 463/42 |
| 2009/0293079 A1* | 11/2009 | McKee et al. | 725/10 |
| 2009/0307609 A1* | 12/2009 | Ganz et al. | 715/753 |
| 2009/0325712 A1* | 12/2009 | Rance | 463/42 |
| 2010/0030660 A1* | 2/2010 | Edwards | 705/27 |
| 2010/0203963 A1* | 8/2010 | Allen et al. | 463/30 |
| 2010/0248843 A1* | 9/2010 | Karsten | 463/43 |
| 2011/0124405 A1* | 5/2011 | Okada et al. | 463/25 |
| 2013/0067356 A1* | 3/2013 | Wakita et al. | 715/753 |
| 2014/0136979 A1* | 5/2014 | Morotomi | 715/716 |

FOREIGN PATENT DOCUMENTS

| | | |
|---|---|---|
| JP | 2007150769 | 6/2007 |
| JP | 2008-129735 | 6/2008 |

OTHER PUBLICATIONS

Japanese Office Action, Application No. 2008-265553, dated Oct. 9, 2012.

* cited by examiner

FIG. 14

(a) USER INFORMATION

| APPARATUS ID | PLAYER'S NAME |
|---|---|
| 3333 | YAMADA |

(b) REGISTRATION INFORMATION (APPARATUS ID = 3333)

| APPARATUS ID | PLAYER'S NAME | ADDRESS | INFORMABILITY |
|---|---|---|---|
| 1111 | SATO | aaaa | INFORMABLE |
| 2222 | SASAKI | bbbb | INFORMABLE |
| 4444 | SUZUKI | dddd | INFORMABLE |

(c) ID LIST OF GROUP (BEFORE)

| GROUP'S NAME | APPARATUS ID | PLAYER'S NAME |
|---|---|---|
| GROUP 1 | 1111 | SATO |
|  | 4444 | SUZUKI |
|  | — | — |
|  | — | — |

(d) ID LIST OF GROUP (AFTER)

| GROUP'S NAME | APPARATUS ID | PLAYER'S NAME |
|---|---|---|
| GROUP 1 | 1111 | SATO |
|  | 4444 | SUZUKI |
|  | 2222 | SASAKI |
|  | — | — |

FIG. 21

(a) REGISTRATION INFORMATION (APPARATUS ID = 3333)

| APPARATUS ID | PLAYER'S NAME | ADDRESS | INFORMABILITY |
|---|---|---|---|
| 1111 | SATO | aaaa | INFORMABLE |
| 2222 | SASAKI | bbbb | INFORMABLE/ UNINFORMABLE |

(b) REGISTRATION INFORMATION (APPARATUS ID = 2222)

| APPARATUS ID | PLAYER'S NAME | ADDRESS | INFORMABILITY |
|---|---|---|---|
| 1111 | SATO | aaaa | INFORMABLE |
| 3333 | YAMADA | cccc | INFORMABLE/ UNINFORMABLE |

(c) INFORMABILITY DETERMINATION METHOD 1

| INFORMABILITY SET IN APPARATUS ID 3333 ABOUT APPARATUS ID 2222 | INFORMABILITY SET IN APPARATUS ID 2222 ABOUT APPARATUS ID 3333 | INFORMABILITY DETERMINATION IN APPARATUS ID 2222 AS TO WHETHER TO INFORM APPARATUS ID 3333 |
|---|---|---|
| INFORMABLE | INFORMABLE | INFORMABLE |
| UNINFORMABLE | INFORMABLE | INFORMABLE |
| INFORMABLE | UNINFORMABLE | UNINFORMABLE |
| UNINFORMABLE | UNINFORMABLE | UNINFORMABLE |

(d) INFORMABILITY DETERMINATION METHOD 2

| INFORMABILITY SET IN APPARATUS ID 3333 ABOUT APPARATUS ID 2222 | INFORMABILITY SET IN APPARATUS ID 2222 ABOUT APPARATUS ID 3333 | INFORMABILITY DETERMINATION IN APPARATUS ID 2222 AS TO WHETHER TO INFORM APPARATUS ID 3333 |
|---|---|---|
| INFORMABLE | INFORMABLE | INFORMABLE |
| UNINFORMABLE | INFORMABLE | UNINFORMABLE |
| INFORMABLE | UNINFORMABLE | UNINFORMABLE |
| UNINFORMABLE | UNINFORMABLE | UNINFORMABLE |

COMPUTER-READABLE STORAGE MEDIUM HAVING DISPLAY CONTROL PROGRAM STORED THEREIN, DISPLAY CONTROL DEVICE, AND DISPLAY CONTROL SYSTEM

CROSS REFERENCE TO RELATED APPLICATION

The disclosure of Japanese Patent Application No. 2008-265553, filed on Oct. 14, 2008, is incorporated herein by reference.

BACKGROUND OF THE INVENTION

1. Field of the Invention

The present invention relates to a computer-readable storage medium having a display control program stored therein, a display control device, and a display control system, and particularly to a computer-readable storage medium having stored therein a display control program that displays, in a first computer included in a plurality of computers on a network, the communication states of the plurality of computers, a display control device, and a display control system.

2. Description of the Background Art

Conventionally, various game apparatuses are proposed that transmit and receive data to and from other apparatuses via a network. For example, a game apparatus is disclosed that registers an address for transmitting and receiving communication data to and from only a game apparatus of a desired user (see Japanese Laid-Open Patent Publication No. 2008-129735, for example). This game apparatus has a friend registration function for registering in advance in a friend list a partner to be permitted transmission and reception of messages.

Further, another game apparatus is known that displays information indicating whether or not a different user (hereinafter referred to as a "friend") registered in the game apparatus as a partner to be permitted transmission and reception is online, and also displays information indicating the game that is being played by the friend (see "Xbox Live Tettei Gaido!!", Dorimaga in the issue of Jan. 31, 2003, Vol. 2, Softbank Publishing Inc., Jan. 31, 2003, pp. 62-63; hereinafter referred to as "Non-patent Document 1", for example).

However, in the game apparatus disclosed in Non-patent Document 1, when the user considers whether or not to participate in a game or the like in which the friend is participating, the user cannot know in advance who the participants other than the friend are. Consequently, it may be difficult to decide whether or not to participate in the game or the like in which the friend is participating.

SUMMARY OF THE INVENTION

In view of the above problems, an object of the present invention is to provide a computer-readable storage medium having stored therein a display control program that makes it possible to easily decide whether or not to participate in a game or the like, a display control device, and a display control system.

The present invention has the following features to achieve the above object. Note that the reference numerals, the figure numbers in parentheses, the supplemental descriptions, and the like indicate an example of the correspondence with the drawings so as to assist understanding of the present invention, and do not limit the scope of the present invention in any way.

A computer-readable storage medium having stored therein a display control program according to the present invention displays, in a first computer (3A) included in a plurality of computers (3) on a network (9), communication states of the plurality of computers (3).

In a first aspect, based on the computer-readable storage medium having stored therein the display control program, the display control program causes the first computer (3A) to function as registration information storage means (171), connection determination means (101), first acquisition means (103), and communication state display means (104). The registration information storage means (171) stores therein pieces of individual information about computers that are registered as communication partners, which are partners with which the first computer (3A) communicates via the network (9), and pieces of distinguishing information, about the computers, associated with the pieces of individual information.

The connection determination means (101) determines whether or not a second computer (3B), which is a computer that corresponds to at least one of the pieces of individual information stored in the registration information storage means (171), is connected to the network (9). The first acquisition means (103) acquires, when the connection determination means (101) has determined that the second computer (3B) is connected to the network (9), a piece of individual information about a third computer (3C) that is communicating with the second computer (3B). The communication state display means (104) visibly displays, based on the piece of individual information about the third computer (3C) acquired by the first acquisition means (103) and the piece of individual information about the second computer (3B), communication states of the second computer (33) and the third computer (3C) associated with each other, and also displays information about the second computer (3B), based on a piece of distinguishing information about the second computer (3B), so as to be distinguishable from other computers.

In a second aspect, based on the computer-readable storage medium having stored therein the display control program according to the first aspect, the display control program further causes the first computer (3A) to function as second acquisition means (105) for acquiring a piece of distinguishing information about the third computer (3C) based on the piece of individual information about the third computer (3C). The communication state display means (104) further displays information about the third computer (3C), based on the piece of distinguishing information about the third computer (3C), so as to be distinguishable. Consequently, for example, the piece of distinguishing information about the second computer (3B) and the piece of distinguishing information about the third computer (3C) can be displayed in association with each other, and therefore the user of the first computer (3A) can easily decide whether or not to participate in a game or the like played between the second computer (3B) and the third computer (3C).

In a third aspect, based on the computer-readable storage medium having stored therein the display control program according to the first aspect, the display control program further causes the first computer (3A) to function as second acquisition means (105) and storage determination means (106). The second acquisition means (105) acquires a piece of distinguishing Information about the third computer (3C) based on the piece of individual information about the third computer (3C). The storage determination means (106) determines whether or not the piece of individual information about the third computer (3C) is stored in the registration information storage means (171). Only when the storage determination means (106) has determined that the piece of individual information about the third computer (3C) is stored in the registration information storage means (171), the communication state display means (104) displays the third computer (3C), based on the piece of distinguishing information about the third computer (3C), so as to be distinguishable. Consequently, when the third computer (3C) is not registered as a friend of the first computer (3A), it is prohibited to display in the first computer (3A) the piece of distinguishing information about the third computer (3C) and the like, and therefore it is possible to protect the privacy of the user of the third computer (3C).

In a fourth aspect, based on the computer-readable storage medium having stored therein the display control program according to the first aspect, the display control program further causes the first computer (3A) to function as number-of-computers determination means (108) and communicability display means (109). The number-of-computers determination means (108) determines whether or not the number of computers that are communicating with the second computer (3B) is equal to or smaller than a predetermined number (three, in this case). When the number-of-computers determination means (108) has determined that the number of computers is equal to or smaller than a predetermined number, the communicability display means (109) visibly displays that it is possible to communicate with the second computer (3B). Consequently, the user of the first computer (3A) can easily decide whether or not it is possible to communicate with the second computer (3B).

In a fifth aspect, based on the computer-readable storage medium having stored therein the display control program according to the fourth aspect, when the number-of-computers determination means (108) has determined that the number of computers is equal to or smaller than a predetermined number (three, in this example), the communicability display means (109) visibly displays the number of computers that can communicate with the second computer (3B) Consequently, the user of the first computer (3A) can easily understand the number of computers that can communicate with the second computer (3B).

In a sixth aspect, based on the computer-readable storage medium having stored therein the display control program according to the first aspect, the display control program further causes the first computer (3A) to function as second acquisition means (105) and informing determination means (110). The second acquisition means (105) acquires a piece of distinguishing information about the third computer (3C) based on the piece of individual information about the third computer (3C). When the connection determination means (101) has determined that the second computer (3B) is connected to the network (9), the informing determination means (110) determines whether or not it is permitted, in the second computer (3B), to inform the first computer (3A) of the piece of distinguishing Information about the third computer (3C). Only when the informing determination means (110) has determined that it is permitted to inform the first computer, the communication state display means (104) displays information about the third computer (3C), based on the piece of distinguishing information about the third computer (3C), so as to be distinguishable. Consequently, when it is not permitted, in the second computer (3B), to inform the first computer (3A) of the piece of distinguishing information about the third computer (3C), the third computer (3C) is not displayed so as to be distinguishable, and therefore it is possible to protect the privacy of the user of the third computer (3C).

In a seventh aspect, based on the computer-readable storage medium having stored therein the display control program according to the sixth aspect, the display control program further causes the first computer (3A) to function as informability storage means (172) for storing each of the pieces of individual information stored in the registration information storage means (171), in association with a piece of informability information indicating whether or not it is permitted to inform another computer, which corresponds to said each of the pieces of individual information, of a piece of distinguishing information about yet another computer that is communicating with the first computer (3A).

In an eighth aspect, based on the computer-readable storage medium having stored therein the display control program according to the seventh aspect, the display control program further causes the first computer (3A) to function as informability setting means (112) for receiving an external operation input, setting, based on the received operation input, the piece of informability information with respect to each of the pieces of individual information stored in the registration information storage means (171), and storing the set piece of informability information in the informability storage means (172). Consequently, it is possible to easily set apiece of informability information.

In a ninth aspect, based on the computer-readable storage medium having stored therein the display control program according to the sixth aspect, the second computer (3B) has stored therein a piece of informability information indicating whether or not it is permitted to inform the first computer (3A) of the piece of distinguishing information about the third computer (3C). In this case, the informing determination means (110) acquires the piece of informability information from the second computer (3B) and determines, based on the piece of informability information, whether or not it is permitted to inform the first computer (3A) of the piece of distinguishing information about the third computer (3C). Consequently, it is possible, with a simple structure, whether or not it is permitted, in the second computer (3B), to inform the first computer (3A) of the piece of the distinguishing information about the third computer (3C).

In a tenth aspect, based on the computer-readable storage medium having stored therein the display control program according to the first aspect, the pieces of individual information are pieces of ID information assigned in advance to the plurality of computers. Consequently, it is possible to easily identify the plurality of computers.

In an eleventh aspect, based on the computer-readable storage medium having stored therein the display control program according to the first aspect, each of the pieces of distinguishing information includes at least either name information or face image information that is an image representing a person's face. Consequently, it is possible to easily distinguish the users of the third computer (3C) and the like based on the pieces of distinguishing information.

In a twelfth aspect, based on the computer-readable storage medium having stored therein the display control program according to the first aspect, the plurality of computers are connected to each other so as to communicate externally input voice information to each other. Consequently, it is possible to easily decide whether or not to participate in a voice chat (i.e., a chat held through voice) held between the second computer (3B) and the third computer (3C).

In a thirteenth aspect, based on the computer-readable storage medium having the display control program according to the first aspect, the plurality of computers are connected to each other so as to communicate externally input character information to each other. Consequently, it is possible to easily decide whether or not to participate in a text chat (i.e., a chat held through text) held between the second computer (3B) and the third computer (3C).

In a fourteenth aspect, based on the computer-readable storage medium according to the display control program according to the first aspect, the plurality of computers are connected to each other so as to communicate externally input operation input information to each other, and so as also to communicate game information about a game executed based on the operation input information to each other. Consequently, it is possible to easily decide whether or not to participate in a game played between the second computer (3B) and the third computer (3C).

In a fifteenth aspect, a display control device (10, 17) displays, in a first computer (3A) included in a plurality of computers (3) on a network (9), communication states of the plurality of computers (3). The display control device (10, 17) includes registration information storage means (171), connection determination means (101), first acquisition means (103), and communication state display means (104). The registration information storage means (171) stores therein pieces of individual information about computers that are registered as communication partners, which are partners with which the first computer (3A) communicates via the network (9), and pieces of distinguishing information, about the computers, associated with the pieces of individual information.

The connection determination means (101) determines whether or not a second computer (3B), which is a computer that corresponds to at least one of the pieces of individual information stored in the registration information storage means (171), is connected to the network (9). When the connection determination means (101) has determined that the second computer (3B) is connected to the network (9), the first acquisition means (103) acquires a piece of individual information about a third computer (3C) that is communicating with the second computer (3B). The communication state display means (104) visibly displays, based on the piece of individual information about the third computer (3C) acquired by the first acquisition means (103) and the piece of individual information about the second computer (3B), communication states of the second computer (3C) and the third computer (3C) associated with each other, and also displays information about the second computer (3B), based on a piece of distinguishing information about the second computer (3B), so as to be distinguishable from other computers.

In a sixteenth aspect, a display control system, provided with a plurality of computers (3) and a server (8) on a network (9), displays, in a first computer (3A) included in the plurality of computers (3), communication states of the plurality of computers (3). The server (8) includes communication partner storage means (81). The first computer (3A) includes registration information storage means (171), connection determination means (101), first acquisition means (103), and communication state display means (104).

The communication partner storage means (81) stores therein a piece of individual information about each of the plurality of computers (3) in association with pieces of individual information about others of the plurality of computers (3) that are communicating with each of the plurality of computers (3).

The registration information storage means (171) stores therein pieces of individual information about computers that are registered as communication partners, which are partners with which the first computer (3A) communicates via the network (9), and pieces of distinguishing information, about the computers, associated with the pieces of individual information. The connection determination means (101) determines whether or not a second computer (2B), which is a computer that corresponds to at least one of the pieces of individual information stored in the registration information storage means (171), is connected to the network (9).

When the connection determination means (101) has determined that the second computer (3B) is connected to the network (9), the first acquisition means (103) acquires a piece of individual information, stored in the communication partner storage means (81) of the server (8), about a third computer (3C) that is communicating with the second computer (3B). The communication state display means (104) visibly displays, based on the piece of individual information about the third computer (3C) acquired by the first acquisition means (103) and the piece of individual information about the second computer (3B), communication states of the second computer (3B) and the third computer (3C) associated with each other, and also displays information about the second computer (3B), based on a piece of distinguishing information about the second computer (3B), so as to be distinguishable from other computers.

Based on the computer-readable storage medium having stored therein the display control program, the display control device (3), and the display control system, each according to the present invention, the communication states of the second computer (3B) and the third computer (3C) associated with each other are visibly displayed based on the piece of individual information about the third computer (3C) and the piece of individual information about the second computer (3B), and therefore the user of the first computer (3A) can easily decide whether or not to participate in a game or the like played between the second computer (3B) and the third computer (3C).

That is, the second computer (3B) is a computer that is registered as a communication partner (a so-called "friend") which is a partner with which the first computer (3A) communicates via the network (9). The third computer (3C) is a computer, which is a communication partner that is communicating with the second computer (3B). Accordingly, for example, it is possible to display the piece of individual information about the third computer (3C) in association with the second computer (3B), and therefore it is possible to understand information about the third computer (3C).

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is tables showing an example of variety of information stored in a game apparatus and a server device;

FIG. 21 is tables illustrating an example of a method of an informability determination made by an informing determination section.

DESCRIPTION OF THE PREFERRED EMBODIMENTS

Overall Structure of Game System

Figure 1:
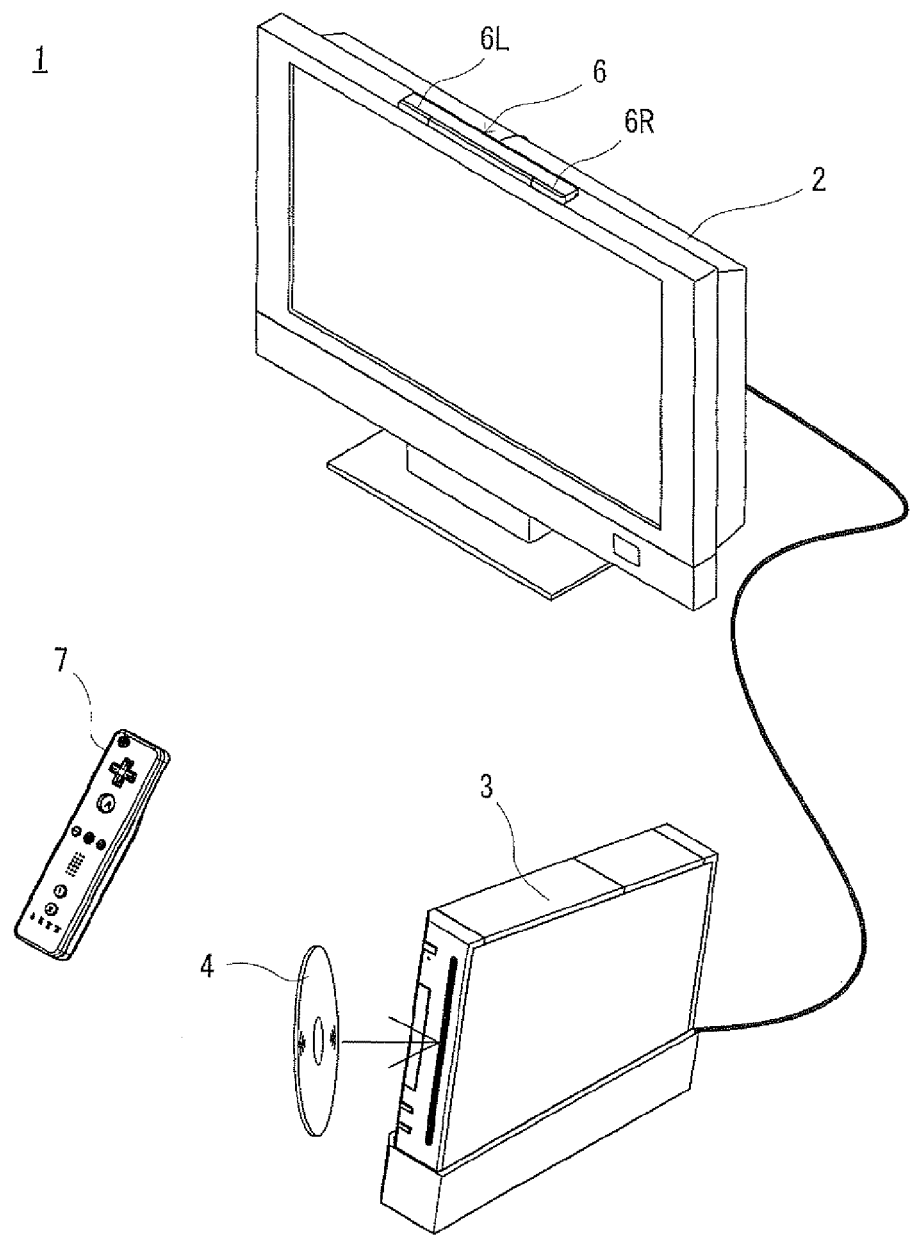
FIG. 1 is an external view of a game system 1 according to an embodiment of the present invention.

With reference to FIG. 1, a game system 1 including a game apparatus according to an embodiment of the present invention will be described. FIG. 1 is an external view of the game system 1. A game apparatus and a game program according to the present embodiment will be described below, taking a stationary game apparatus as an example. Referring to FIG. 1, the game system 1 includes a TV receiver (hereinafter referred to simply as a "TV") 2, a game apparatus 3, an optical disk 4, a marker section 6, and a controller 7. In the game system 1 game processing is executed by the game apparatus 3 based on a game operation performed with the use of the controller 7.

In the game apparatus 3 (corresponding to a computer and a display control device) the optical disk 4, which is an example of an information storage medium exchangeably used for the game apparatus 3, is detachably mounted. The optical disk 4 has stored therein the game program to be executed by the game apparatus 3. The game apparatus 3 has an opening on the front surface thereof for mounting the optical disk 4. The game apparatus 3 reads and executes the game program stored in the optical disk 4 inserted into the opening, and thereby executes the game processing.

The game apparatus 3 is connected to the TV 2, which is an example of a display device, via a connection cord. The TV 2 displays a game image obtained as a result of the game processing executed by the game apparatus 3. In the adjacent area of the display screen of the TV 2 (above the display screen in FIG. 1) the marker section 6 is provided. The marker section 6 includes at two ends thereof two markers 6R and 6L, respectively. Specifically, the marker 6R (also the marker 6L) includes one or more infrared LEDs, and outputs infrared light forward from the TV 2. The marker section 6 is connected to the game apparatus 3, so that the game apparatus 3 can control each of the infrared LEDs included in the marker section 6 to be lit on or off. The marker section 6 has a microphone (not shown) provided therein, so that voice information received via the microphone is input to the game apparatus 3.

The controller 7 is an input device for providing the game apparatus 3 with operation data representing the particulars of the operation performed thereon. The controller 7 and the game apparatus 3 are connected to each other via wireless communication. In the present embodiment the controller 7 and the game apparatus 3 wirelessly communicate with each other using, for example, the Bluetooth (registered trademark) technology. Note that in another embodiment the controller 7 and the game apparatus 3 may be connected to each other in a wired manner.

Internal Structure of Game Apparatus 3

Figure 2:
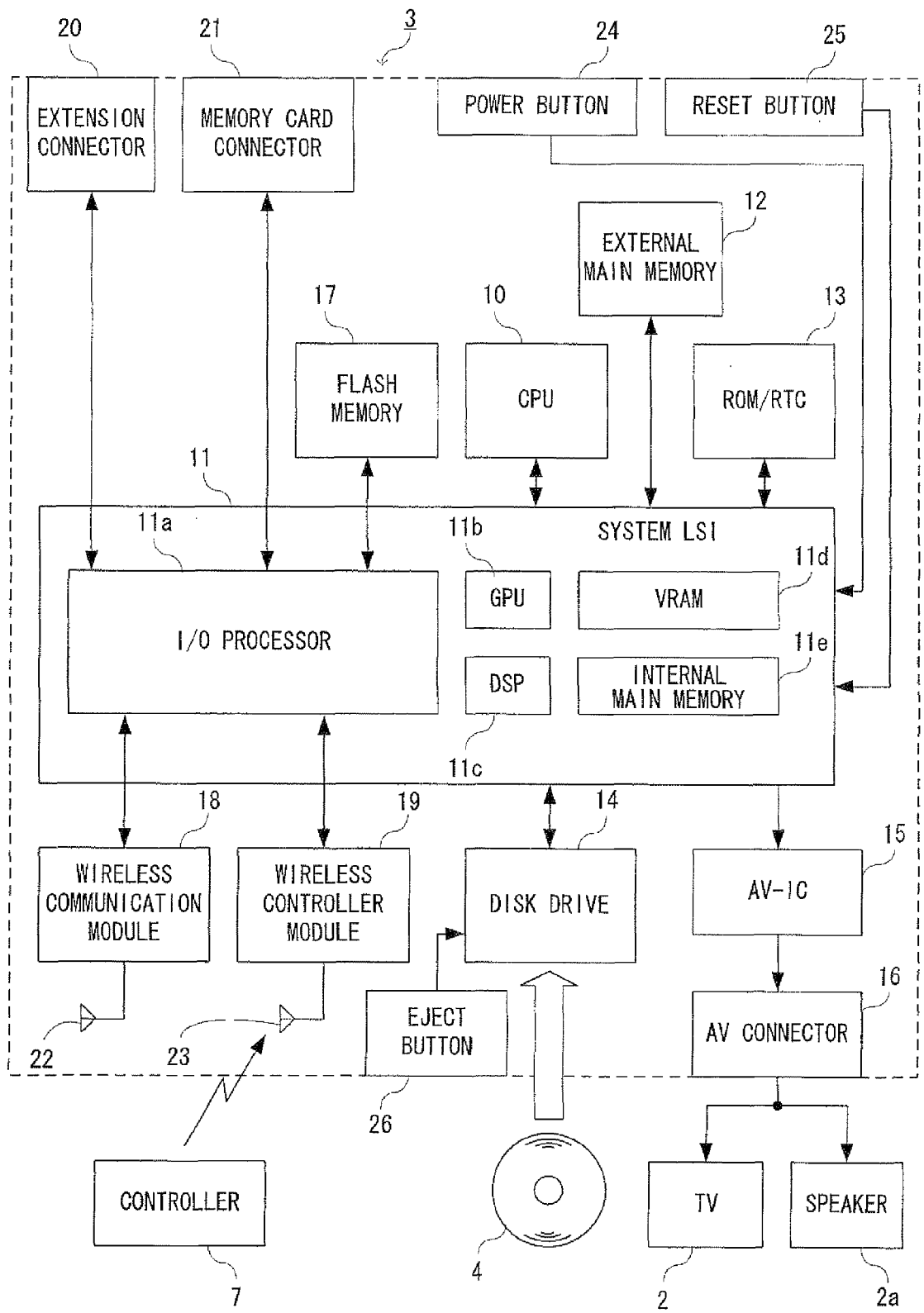
FIG. 2 is a block diagram showing the structure of a game apparatus 3.

Next, with reference to FIG. 2, the internal structure of the game apparatus 3 will be described. FIG. 2 is a block diagram showing the structure of the game apparatus 3. The game apparatus 3 includes a CPU 10, a system LSI 11, an external main memory 12, a ROM/RTC 13, a disk drive 14, an AV-IC 15, and the like.

The CPU 10, which executes the game processing by executing the game program stored in the optical disk 4, functions as a game processor. The CPU 10 is connected to the system LSI 11. The system LSI 11 is connected to the CPU 10 and also to the external main memory 12, the ROM/RTC 13, the disk drive 14, and the AV-IC 15. The system LSI 11, for example, controls data transfer between the elements connected thereto, generates images to be displayed, and obtains data from external devices. The internal structure of the system LSI 11 will be described below. The external main memory 12, which is of a volatile type, stores therein programs including the game program read from the optical disk 4, the game program read from a flash memory 17, or various other data. The external main memory 12 is used as a work area or a buffer area of the CPU 10. The ROM/RTC 13 includes a ROM (a so-called boot ROM) having incorporated therein a program for starting the game apparatus 3 and also includes a clock circuit (RTC: Real Time Clock) for counting time. The disk drive 14 reads program data, texture data, or the like from the optical disk 4, and writes the read data into an internal main memory 11e described below or the external main memory 12.

The system LSI 11 includes an input/output processor (I/O processor) 11a, a GPU (Graphics Processor Unit) 11b, a DSP (Digital Signal Processor) 11c, a VRAM 11d, and an internal main memory 11e. Although not shown, these elements 11a through 11e are connected to each other via an internal bus.

The GPU 11b, which forms a part of drawing means, generates an image in accordance with a graphics command (a command to draw an image) from the CPU 10. The VRAM 11d stores therein data (polygon data, texture data, etc.) necessary for the GPU 11b to execute the graphics command. The CPU 11b uses the data stored in the VRAM 11d to generate image data.

The DSP 11c functions as an audio processor and generates audio data by using sound data, acoustic waveform (timbre) data, and the like that are stored in the internal main memory 11e or the external main memory 12.

The image data and the audio data that have been generated as described above are read by the AV-IC 15. The AV-IC 15 outputs the read image data to the TV 2 via an AV connector 16, and also outputs the read audio data to a speaker 2a built in the TV 2. Thus an image is displayed on the TV 2 and also a sound is output from the speaker 2a.

The input/output processor 11a transmits or receives data to or from the elements connected thereto, or downloads data from external devices. The input/output processor 11a is connected to the flash memory 17, a wireless communication module 18, a wireless controller module 19, an extension connector 20, and a memory card connector 21. The wireless communication module 18 is connected to an antenna 22. The wireless controller module 19 is connected to an antenna 23.

The input/output processor 11a is connected to a network via the wireless communication module 18 and the antenna 22, and therefore can communicate with other game apparatuses or various servers that are also connected to the network. The input/output processor 11a periodically accesses the flash memory 17 and detects the presence or absence of data required to be transmitted to the network. When the data is present, the input/output processor 11a transmits the data to the network via the wireless communication module 18 and the antenna 22. The input/output processor 11a also receives data transmitted from other game apparatuses or data downloaded from a download server, via the network, the antenna 22, and the wireless communication module 18, and stores the received data in the flash memory 17. The CPU 10 executes the game program, and thereby reads the data stored in the flash memory 17 and uses the read data for the game program. The flash memory 17 may have stored therein data (data stored after or during the game) saved as a result of playing the game with use of the game apparatus 3, as well as data to be transmitted to, or data received from, other game apparatuses or various servers.

The input/output processor 11a also receives operation data transmitted from the controller 7 via the antenna 23 and the wireless controller module 19, and stores (temporarily stores) the operation data in a buffer area of the internal main memory 11e or the external main memory 12.

The input/output processor 11a is connected to the extension connector 20 and the memory card connector 21. The extension connector 20, which is a connector for an interface such as USB or SCSI, can be connected to a medium such as an external storage medium, can be connected to a peripheral device such as another controller, or can be connected to a wired communication connector and thereby communicate with the network instead of the wireless communication module 18. The memory card connector 21 is a connector for connecting an external storage medium such as a memory card. For example, the input/output processor 11a can access an external storage medium via the extension connector 20 or the memory card connector 21, and therefore can store or read data.

The game apparatus 3 has a power button 24, a reset button 25, and an eject button 26. The power button 24 and the reset button 25 are connected to the system LSI 11. When the power button 24 is turned on, the elements of the game apparatus 3 are supplied with power via an AC adaptor (not shown). When the reset button 25 is pressed, the system LSI 11 restarts a starting program of the game apparatus 3. The eject button 26 is connected to the disk drive 14. When the eject button 26 is pressed, the optical disk 4 is ejected from the disk drive 14.

Figure 3:
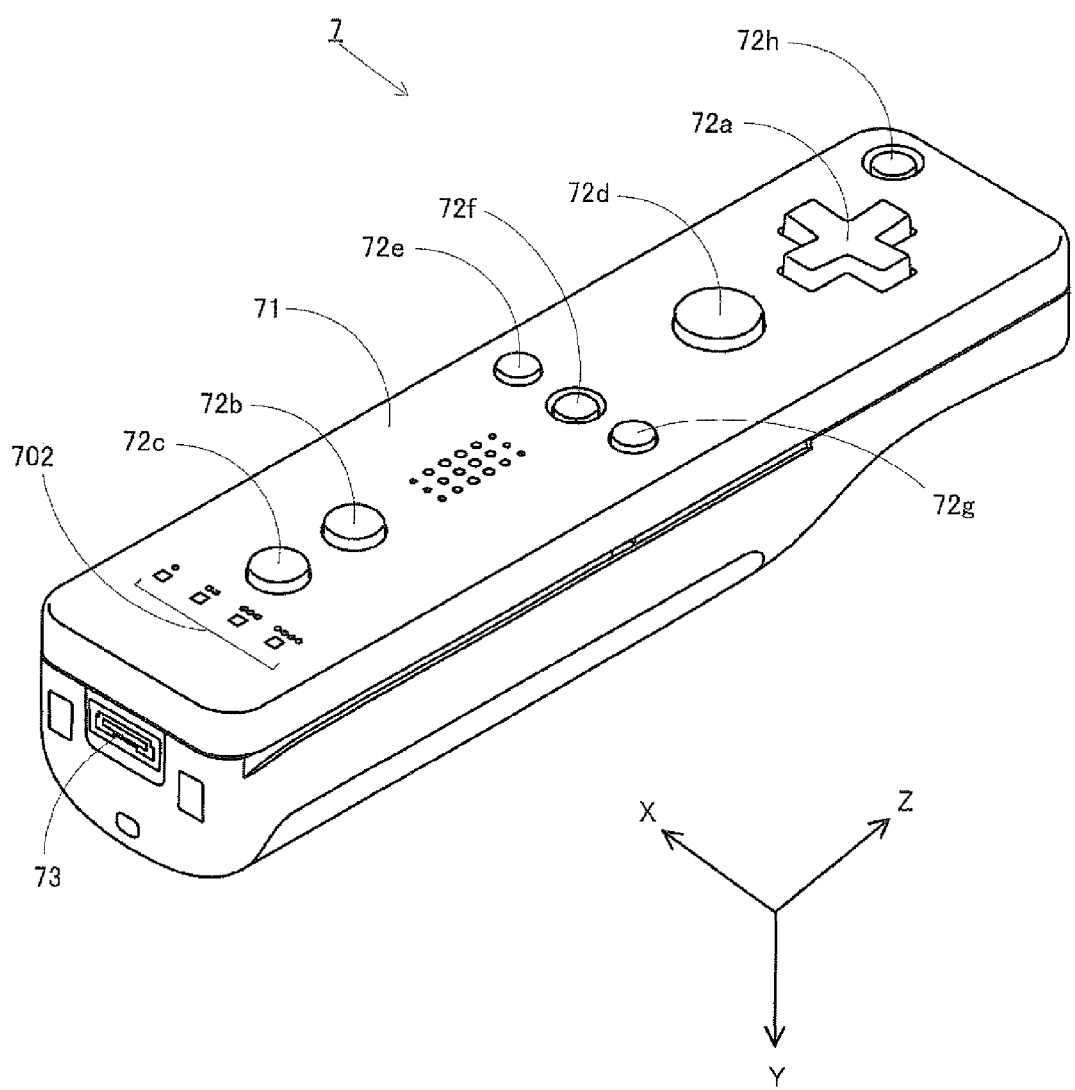
FIG. 3 is a perspective view showing a controller 7 from the top rear side thereof.
Figure 4:
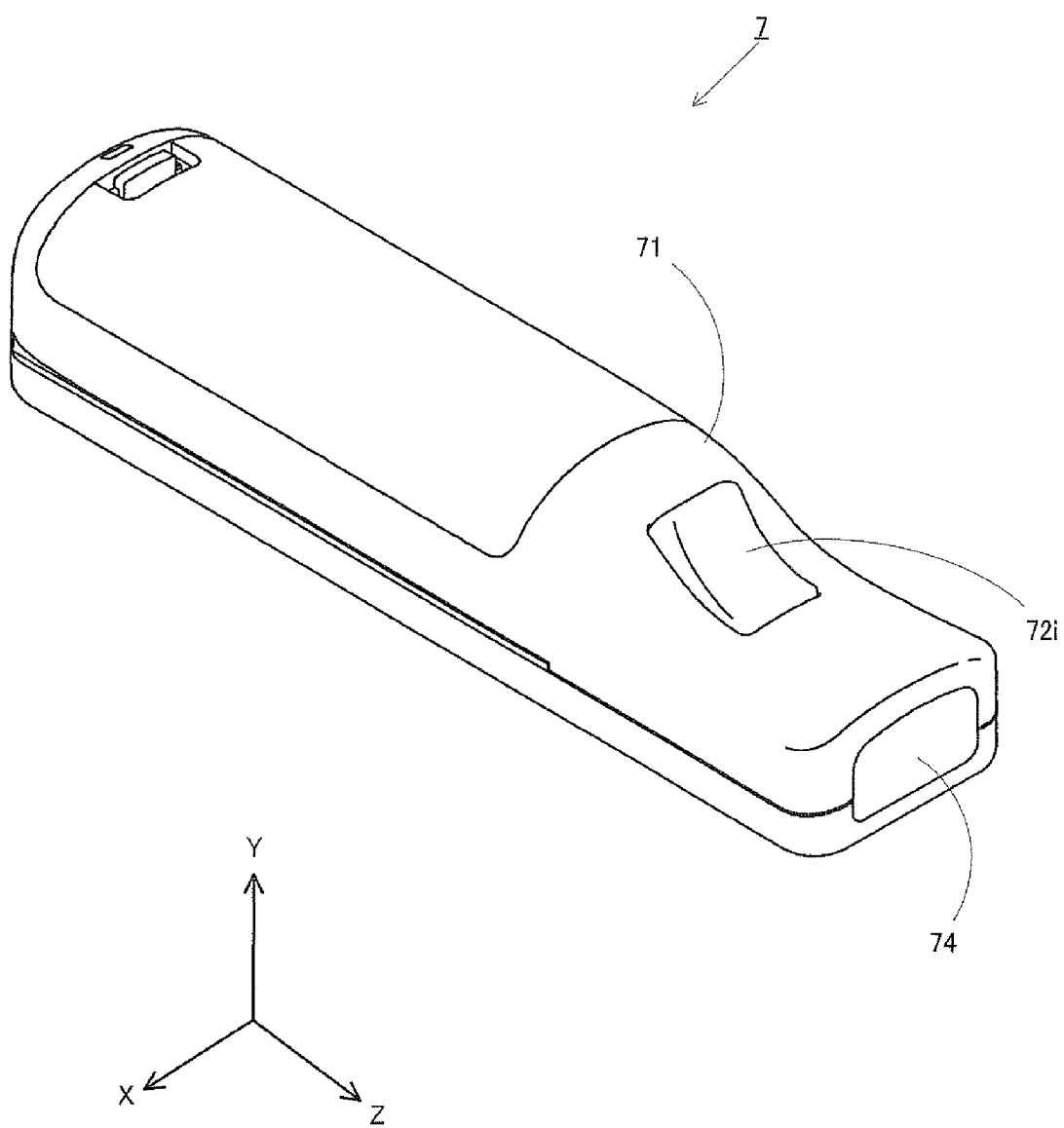
FIG. 4 is a perspective view showing the controller 7 from the bottom front side thereof.

With reference to FIGS. 3 and 4, the controller 7 will be described. Note that FIG. 3 is a perspective view showing the controller 7 from the top rear side thereof. FIG. 4 is a perspective view showing the controller 7 from the bottom front side thereof.

Referring to FIGS. 3 and 4, the controller 7 includes a housing 71 formed by plastic molding or the like. The housing 71 has a plurality of operation sections 72. The housing 71 has a generally parallelepiped shape extending in the longitudinal direction from front to rear. The whole housing 71 can be held with one hand by an adult or even a child.

At the center of the anterior part of the top surface of the housing 71 a cross key 72a is provided. The cross key 72a is a cross-shaped four-direction push switch. The cross key 72a includes operation portions corresponding to four directions (front, rear, right, and left), which are respectively placed on the projecting portions, arranged at 90 degree intervals, of the cross shape. The player selects one of the front, rear, right, and left directions by pressing one of the operation portions of the cross key 72a. For example, through an operation on the cross key 72a, the player can instruct a player character or the like that appears in a virtual game world to move in the indicated direction, or select one of a plurality of options.

Note that the cross key 72a is an operation section for outputting an operation signal in accordance with the player's direction input operation described above; however, such an operation section may be provided in another form. For example, the cross key 72a may be replaced by an operation section that has four separate push switches extending in four directions corresponding to a cross, and may output an operation signal in accordance with one of the four push switches pressed by the player. Alternatively, an operation section may be provided that has a center switch, at the position at which the four directions meet, as well as and in combination with the above four push switches. Yet alternatively, the cross key 72a may be replaced by an operation section that includes an inclinable stick (a so-called joystick) projecting from the top surface of the housing 71 and outputs an operation signal in accordance with the inclining direction of the stick. Yet alternatively, the cross key 72a may be replaced by an operation section that includes a disk-shaped member horizontally slidable and outputs an operation signal in accordance with the sliding direction of the disk-shaped member. Yet alternatively, the cross key 72a may be replaced by a touch pad.

Posterior to the cross key 72a on the top surface of the housing 71, a plurality of operation buttons 72b, 72c, 72d, 72e, 72f, and 72g are provided. The operation buttons 72b, 72c, 72d, 72e, 72f, and 72g are operation sections for outputting, when the player presses the heads of the buttons, operation signals assigned to the operation buttons 72b, 72c, 72d, 72e, 72f, and 72g, respectively. For example, the operation buttons 72b, 72c, and 72d are assigned functions of a first button, a second button, and an A-button, respectively. Further, for example, the operation buttons 72e, 72f, and 72g are assigned functions of a minus button, a home button, and a plus button, respectively. The operation buttons 72a, 72b, 72c, 72d, 72e, 72f, and 72g are assigned various operation functions in accordance with the game program executed by the game apparatus 3. Note that referring to an example arrangement shown in FIG. 3, the operation buttons 72b, 72c, and 72d are arranged in a line in the front-rear direction at the center on the top surface of the housing 71. The operation buttons 72e, 72f, and 72g are arranged in a line in the left-right direction between the operation buttons 72b and 72d on the top surface of the housing 71. The operation button 72f has the top surface thereof buried in the top surface of the housing 71, so as not to be inadvertently pressed by the player.

Anterior to the cross key 72a on the top surface of the housing 71, an operation button 72h is provided. The operation button 72h is a power switch for remotely turning on/off power to the game apparatus 3. The operation button 72h also has the top surface thereof buried in the top surface of the housing 71, so as not to be inadvertently pressed by the player.

Posterior to the operation button 72c on the top surface of the housing 71, a plurality of LEDs 702 are provided. The controller 7 is assigned a controller type (number) so as to be distinguishable from other controllers 7. For example, the LEDs 702 may be used to inform the player of the controller type currently set for the controller 7 that he/she is using. Specifically, when transmission data is transmitted from the controller 7 to the wireless communication module 18, one of the plurality of LEDs 702 that corresponds to the controller type is lit on.

Between the operation button 72b and the operation buttons 72e, 72f and 72g on the top surface of the housing 71, a sound hole is provided for outputting to the outside a sound from a speaker (a speaker 706 shown in FIG. 5) described below.

On the other hand, on the bottom surface of the housing 71 a recessed portion is formed. The recessed portion is formed at the position at which an index finger or a middle finger of the player is to be placed when the player holds the controller 7 with one hand while orienting the front surface of the controller 7 toward the markers 6L and 6R. On a slope surface (on the rear surface side) of the recessed portion an operation button 72i is provided. The operation button 72i is an operation section that functions as, for example, a B-button.

On the front surface of the housing 71 an image pickup device 743 included in an imaging information calculation section 74 is provided. The imaging information calculation section 74 is a system for analyzing image data captured by the controller 7, determining an area having a high brightness in the image data, and therefore detecting the center of gravity, the size, and the like of the determined area. The imaging information calculation section 74 has a maximum sampling period of, for example, about 200 frames/sec., and therefore can trace and analyze even a relatively fast motion of the controller 7. The imaging information calculation section 74 will be described in detail below. On the rear surface of the housing 71 a connector 73 is provided. The connector 73 may be, for example, an edge connector, and is used to engage and connect with, for example, a connecting cable.

Here, in order to make the following description specific, a coordinate system to be set for the controller 7 is defined. As shown in FIGS. 3 and 4, an X-axis, a Y-axis, and a Z-axis, which are orthogonal to each other, are defined for the controller 7. Specifically, the longitudinal direction of the housing 71 corresponding to the front-rear direction of the controller 7 is defined as a Z-axis direction, and a direction toward the front surface (a surface on which the imaging information calculation section 74 is provided) of the controller 7 is defined as a Z-axis positive direction. The up-down direction of the controller 7 is defined as a Y-axis direction, and a direction toward the bottom surface (a surface on which the operation button 72i is provided) of the housing 71 is defined as a Y-axis positive direction. The Left-right direction of the controller 7 is defined as an X-axis direction, and a direction toward the left side surface (a side surface not shown in FIG. 3 but shown in FIG. 4) of the housing 71 is defined as an X-axis positive direction.

Figure 5:
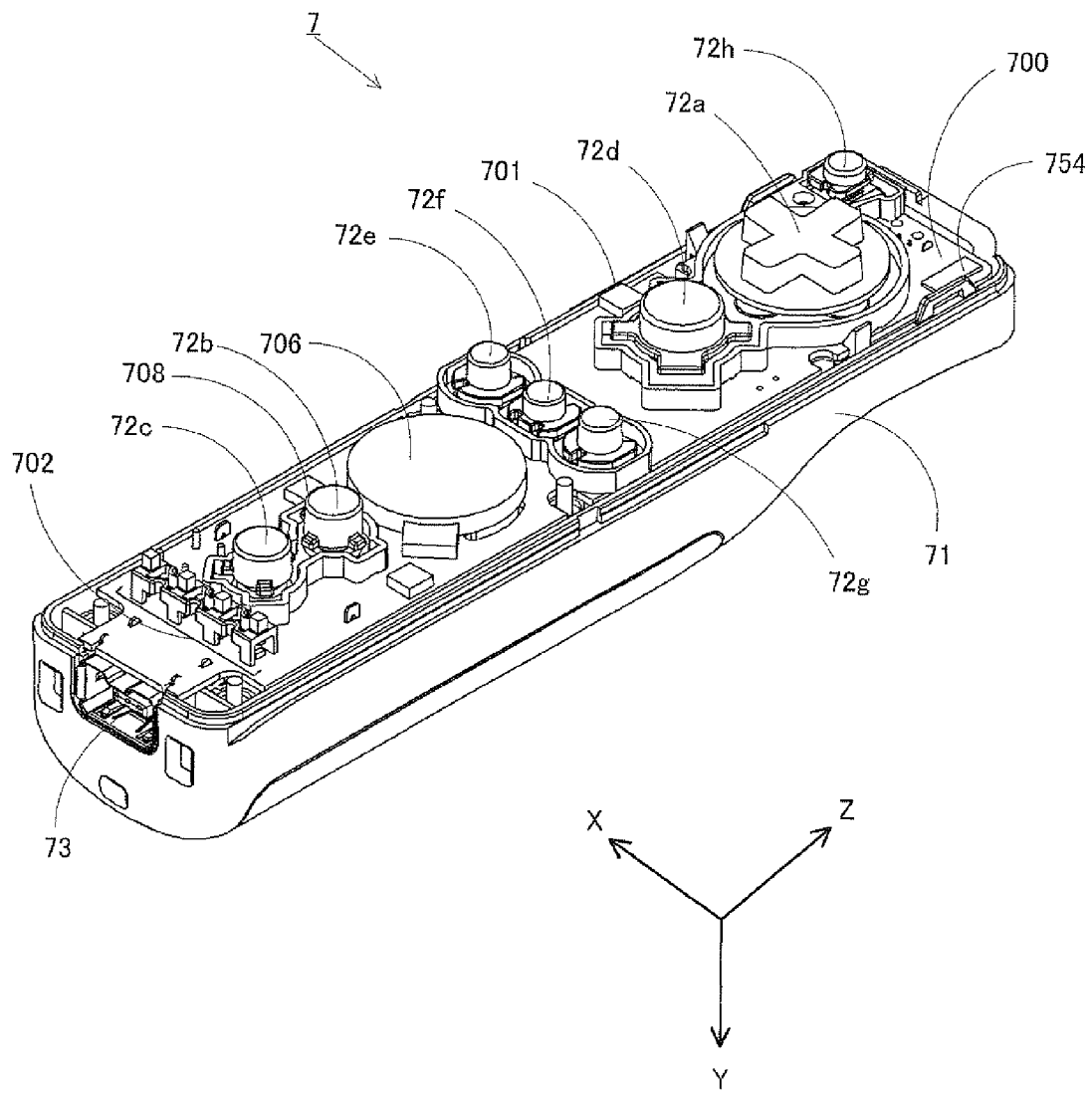
FIG. 5 is a perspective view showing a state where an upper casing of the controller 7 is removed.
Figure 6:
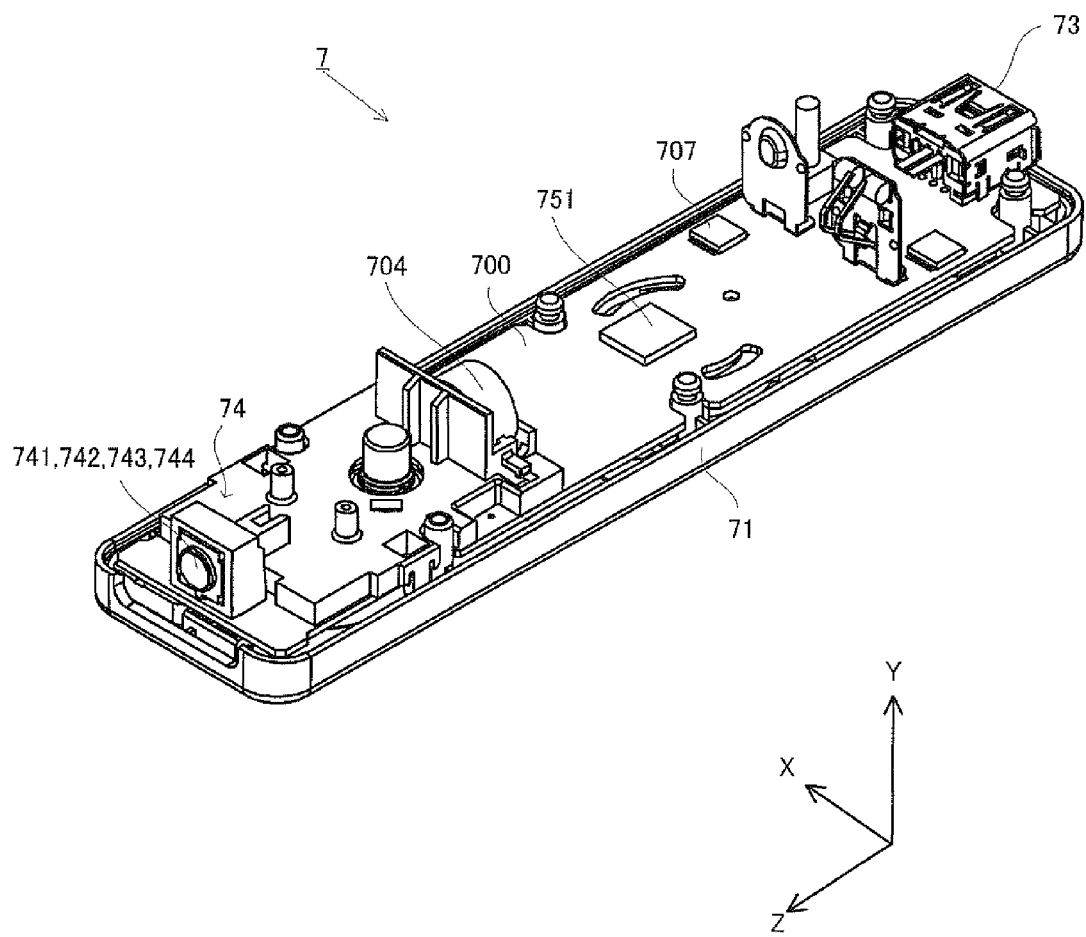
FIG. 6 is a perspective view showing a state where a lower casing of the controller 7 is removed.

Next, with reference to FIGS. 5 and 6, the internal structure of the controller 7 will be described. Note that FIG. 5 is a perspective view, from the top rear surface of the controller 7, showing a state where an upper casing (a part of the housing 71) of the controller 7 is removed. FIG. 6 is a perspective view, from the bottom front surface of the controller 7, showing a state where a lower casing (a part of the housing 71) of the controller 7 is removed. FIG. 6 is a perspective view showing the reverse side of a substrate 700 shown in FIG. 5.

Referring to FIG. 5, the substrate 700 is fixed within the housing 71. On the top main surface of the substrate 700 the operation buttons 72a, 72b, 72c, 72d, 72e, 72f, 72g and 72h, an acceleration sensor 701, the LEDs 702, an antenna 754, and the like are provided. These elements are connected to a microcomputer 751 (see FIGS. 6 and 7) and the like via wiring (not shown) formed on the substrate 700 and the like. A wireless module 753 (see FIG. 7) and the antenna 754 allow the controller 7 to function as a wireless controller. Note that a quartz oscillator 703 (not shown), which is provided within the housing 71, generates a reference clock of the microcomputer 751 described below. On the top main surface of the substrate 700 the speaker 706 and an amplifier 708 are provided. The acceleration sensor 701 is provided on the substrate 700 to the left of the operation button 72d (i.e., provided not in the center portion but in the peripheral portion of the substrate 700). Accordingly, in accordance with the rotation of the controller 7 about the axis of the longitudinal direction thereof, the acceleration sensor 701 can detect acceleration containing a centrifugal force component, as well as a directional change of gravity acceleration. Thus, by a predetermined calculation, the game apparatus 3 and the like can determine the rotation of the controller 7 based on the detected acceleration data with excellent sensitivity.

On the other hand, referring to FIG. 6, at the front edge of the bottom main surface of the substrate 700 the imaging information calculation section 74 is provided. The imaging information calculation section 74 includes an infrared filter 741, a lens 742, the image pickup device 743, and an image processing circuit 744 that are placed in order starting from the front surface of the controller 7 and attached on the bottom main surface of the substrate 700. At the rear edge of the bottom main surface of the substrate 700 the connector 73 is attached. On the bottom main surface of the substrate 700 a sound IC 707 and the microcomputer 751 are provided. The sound IC 707, connected to the microcomputer 751 and the amplifier 708 via the wiring formed on the substrate 700 and the like, outputs an audio signal to the speaker 706 via the amplifier 708 in accordance with the sound data transmitted from the game apparatus 3.

On the bottom main surface of the substrate 700 a vibrator 704 is attached. The vibrator 704 may be, for example, a vibration motor or a solenoid. The vibrator 704, connected to the microcomputer 751 via the wiring formed on the substrate 700 and the like, is powered on/off in accordance with vibration data transmitted from the game apparatus 3. The controller 7 is vibrated by the actuation of the vibrator 704, and the vibration is conveyed to the player's hand holding the controller 7. Thus a so-called vibration-feedback game can be realized. Since the vibrator 704 is placed slightly anterior to the center of the housing 71, a large vibration of the housing 71 allows the player holding the controller 7 to easily feel the vibration.

Next, with reference to FIG. 7, the internal structure of the controller 7 will be described. Note that FIG. 7 is a block diagram showing the structure of the controller 7.

Figure 7:
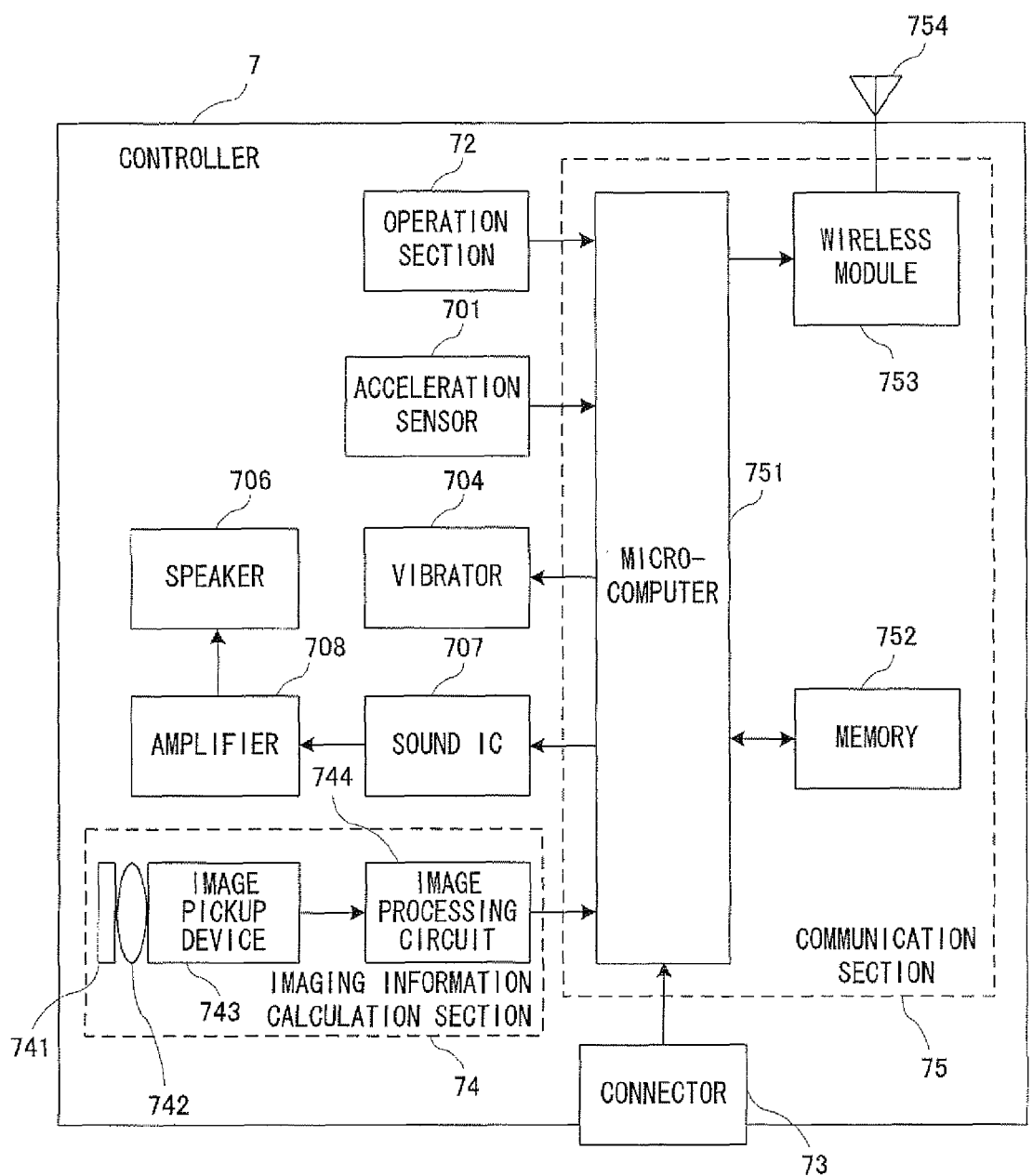
FIG. 7 is a block diagram showing the structure of the controller 7.

Referring to FIG. 7, the controller 7 includes a communication section 75, as well as the operation sections 72, the imaging information calculation section 74, the acceleration sensor 701, the vibrator 704, the speaker 706, the sound IC 707, and the amplifier 708 that are described above.

The imaging information calculation section 74 includes the infrared filter 741, the lens 742, the image pickup device 743, and the image processing circuit 744. The infrared filter 741 passes only infrared light, among the light incident on the front surface of the controller 7. The lens 742 collects the infrared light having passed through the infrared filter 741, and emits the infrared light to the image pickup device 743. The image pickup device 743, which is a solid-state image pickup device such as a CMOS sensor or a CCD, captures the infrared light collected by the lens 742. Accordingly, the image pickup device 743 captures only the infrared light having passed through the infrared filter 741, and thereby generates image data. The image data generated by the image pickup device 743 is processed by the image processing circuit 744. Specifically, the image processing circuit 744 processes the image data obtained by the image pickup device 743, senses an area having a high brightness in the image data, and outputs to the communication section 75 the process result data representing the result of the detected position coordinates and the detected size of the area. Note that the imaging information calculation section 74 is fixed to the housing 71 of the controller 7, so that the capturing direction of the imaging information calculation section 74 can be changed by the change of the direction of the housing 71 per se.

It is preferable that the controller 7 includes a three-axis (X-axis, Y-axis, and Z-axis) acceleration sensor 701. The three-axis acceleration sensor 701 senses linear accelerations In three directions, i.e., the up-down direction (the Y-axis shown in FIG. 3), the left-right direction (the X-axis shown in FIG. 3), and the front-rear direction (the Z-axis shown in FIG. 3).

The communication section 75 includes the microcomputer 751, a memory 752, the wireless module 753, and the antenna 754. With the use of the memory 752 as a storage area during the process, the microcomputer 751 controls the wireless module 753 that wirelessly transmits transmission data. The microcomputer 751 controls the operations of the sound IC 707 and the vibrator 704, based on data received by the wireless module 753 from the game apparatus 3 via the antenna 754. The sound IC 707 processes sound data and the like transmitted from the game apparatus 3 via the communication section 75. The microcomputer 751 also actuates the vibrator 704 based on, for example, vibration data (e.g., a signal for powering the vibrator 704 on/off) transmitted from the game apparatus 3 via the communication section 75.

Data from the controller 7 including an operation signal (key data) from the operation section 72, three-axis direction acceleration signals (X-axis, Y-axis and Z-axis direction acceleration data) from the acceleration sensor 701, and the process result data from the imaging information calculation section 74 is output to the microcomputer 751. The microcomputer 751 temporarily stores in the memory 752 the received data (the key data, the X-axis, Y-axis and Z-axis direction acceleration data, and the process result data) as transmission data to be transmitted to the wireless communication module 18. The wireless transmission from the communication section 75 to the wireless communication module 18 is performed periodically at predetermined time intervals. Since game processing is generally executed in a cycle of 1/60 sec., the wireless transmission is required to be performed in a shorter cycle time. Specifically, a game processing unit is 16.7 ms (1/60 sec.), and the transmission interval of the communication section 75 configured using the Bluetooth (registered trademark) technology is 5 ms. At the time of performing transmission to the wireless communication module 18, the microcomputer 751 outputs the transmission data stored in the memory 752 to the wireless module 753, as a series of operation information. With the use of, for example, the Bluetooth (registered trademark) technology, the wireless module 753 radiates the operation information as an electric wave signal thereof from the antenna 754, using a carrier wave of a predetermined frequency. That is, the data from the controller 7 including the key data from the operation section 72, the X-axis, Y-axis and Z-axis direction acceleration data from the acceleration sensor 701, and the process result data from the imaging information calculation section 74 is transmitted from the controller 7. The wireless communication module 18 of the game apparatus 3 receives the electric wave signal, and the game apparatus 3 demodulates and decodes the electric wave signal, and thereby obtains the series of operation information (the key data, X-axis, Y-axis and Z-axis direction acceleration data, and the process result data). Based on the obtained operation information and the game program, the CPU 10 of the game apparatus 3 executes the game processing. Note that when configured using the Bluetooth (registered trademark) technology, the communication section 75 can also have a function of receiving transmission data wirelessly transmitted from other devices.

Note that the hardware structure described above is provided only for illustrative purposes, and the present invention can also be applied to any arbitrary computer system. For example, the present invention can also be applied to a computer system including a personal computer, instead of the game apparatus 3.

Figure 8:
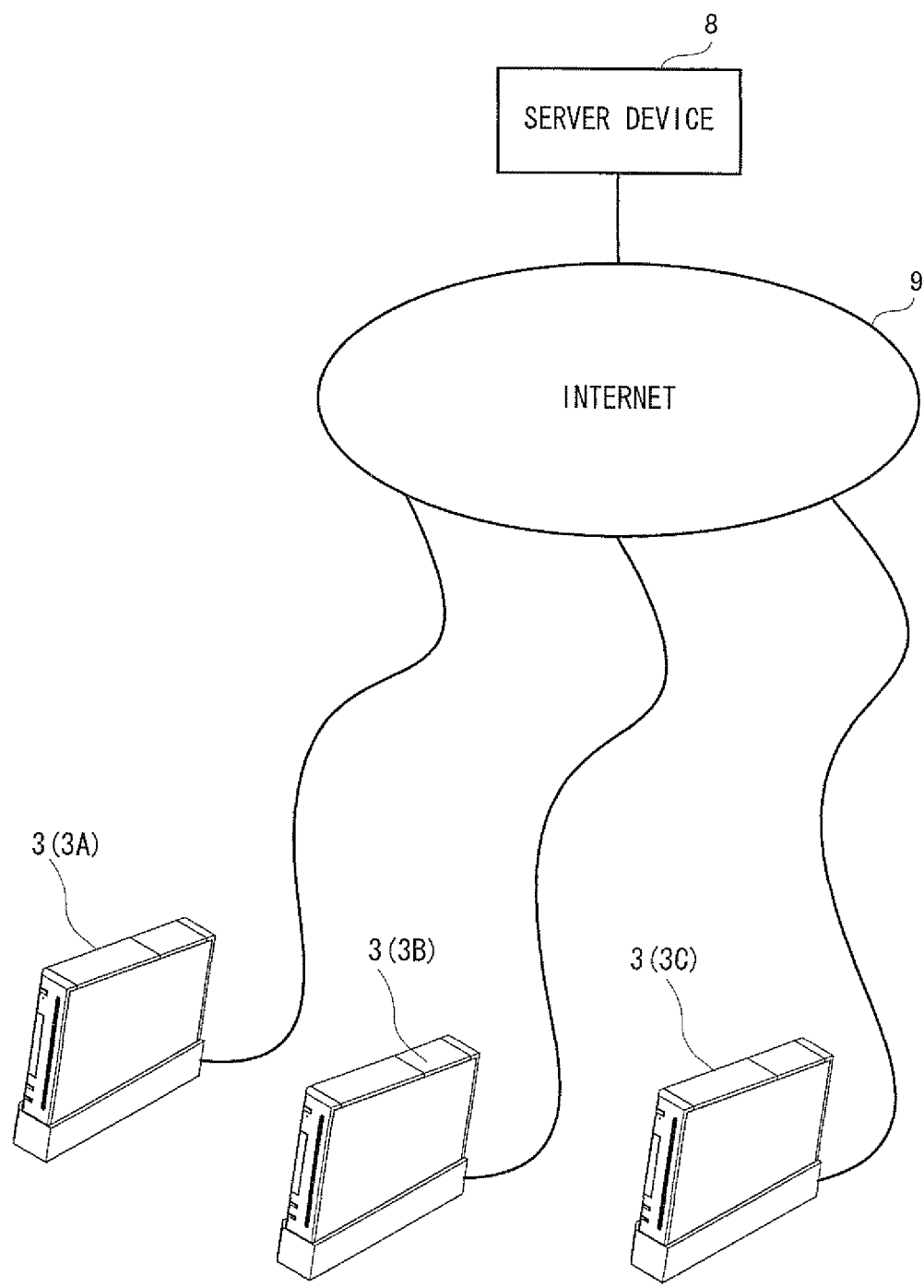
FIG. 8 is a structural diagram showing an example of the structure of a display control system according to the present invention.

Next, the structure of a display control system according to the present invention will be described. FIG. 8 is a structural diagram showing an example of the structure of the display control system according to the present invention. The display control system according to the present invention includes a plurality of (three, in this example) game apparatuses 3 (3A, 3B, and 3C: corresponding to computers) and a server device 8 (corresponding to a server) that are provided on the Internet 9 (corresponding to a network), and displays in the game apparatus 3A the communication state of the game apparatus 3B.

Here, a case is described where the game apparatus 3A and another game apparatus 3 (e.g., the game apparatus 3B, etc.) are communicably connected to each other via the Internet 9 and communicate voice information to each other. The voice information about the voice produced by the user of the game apparatus 3A is input to the game apparatus 3A via the microphone provided in the marker section 6 connected to the game apparatus 3A, is transmitted to the game apparatus 3B via the Internet 9, and is output from the speaker 2a of the TV 2 connected to the game apparatus 3B. Similarly, the voice information about the voice produced by the user of the game apparatus 3B is input to the game apparatus 3B via the microphone provided in the marker section 6 connected to the game apparatus 3B, is transmitted to the game apparatus 3A via the Internet 9, and is output from the speaker 2a of the TV 2 connected to the game apparatus 3A. Thus the user of the game apparatus 3A can have a conversation (a so-called "chat") with the user of the game apparatus 3B.

In the present embodiment a case is described where the game apparatus 3A and another game apparatus 3 (e.g., the game apparatus 3B, etc.) communicate voice information to each other (i.e., the users of the game apparatus 3A and the game apparatus 3B have a chat with each other) via the Internet 9; however, the game apparatus 3A and another game apparatus 3 may communicate character information to each other (i.e., the users of the game apparatus 3A and said another game apparatus 3 have a text chat with each other), or may communicate operation input information and game information to each other (i.e., the users of the game apparatus 3A and said another game apparatus 3 play a game with each other).

In the present embodiment a case is described where a network is the Internet 9; however, a network may be another type of network such as a LAN (Local Area Network) or a WAN (Wide Area Network). In the present embodiment a case is described where a computer is a game apparatus 3; however, a computer may be a personal computer, a mobile phone, or the like. In the present embodiment a case is described where three game apparatuses 3 are connected to each other; however, four or more game apparatuses 3 may be connected to each other. Note that the game apparatus 3A, the game apparatus 3B, and the game apparatus 3C correspond to a first computer, a second computer, and a third computer, respectively.

Figure 9:
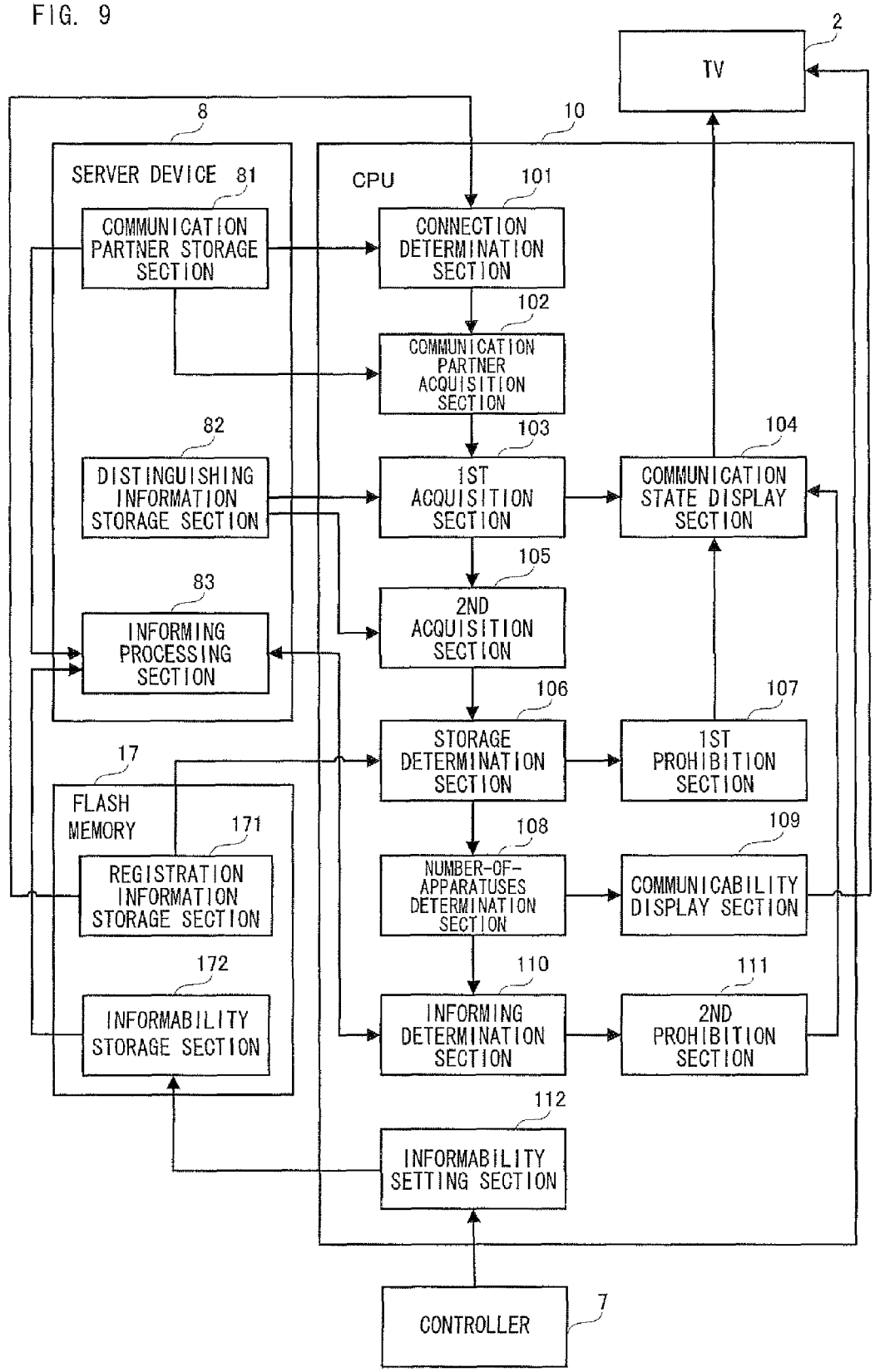
FIG. 9 is a functional structural diagram showing an example of the functional structure of the display control system according to the present invention.

FIG. 9 is a functional structure diagram showing an example of the functional structure of the display control system according to the present invention. The functional structures of the server device 8 and the game apparatus 3 will be described below, taking as an example a case where the game apparatus 3 is the game apparatus 3A unless otherwise stated. The server device 8 functionally includes a communication partner storage section 81, a distinguishing information storage section 82, and an informing processing section 83. The CPU 10 of the game apparatus 3 functionally includes a connection determination section 101, a communication partner acquisition section 102, a first acquisition section 103, a communication state display section 104, a second acquisition section 105, a storage determination section 106, a first prohibition section 107, a number-of-apparatuses determination section 108, a communicability display section 109, an informing determination section 110, a second prohibition section 111, and an informability setting section 112. The flash memory 17 of the game apparatus 3 functionally includes a registration information storage section 171 and an informability storage section 172.

Note that the server device 8 causes a computer such as a CPU (Central Processing Unit) to execute a control program stored in advance in a ROM (Read Only Memory) or the like, and thereby causes a memory such as a RAN (Random Access Memory) or the like to function as the communication partner storage section 81 and the distinguishing information storage section 82 and also causes the computer to function as functional sections of the informing processing section 83 and the like. The CPU, the ROM, and the RAM are each provided at an appropriate position in the server device 8.

The CPU 10 of the game apparatus 3 executes a display control program according to the present invention stored in advance in the optical disk 4 (see FIG. 2) or the like, and thereby functions as functional sections of the connection determination section 101, the communication partner acquisition section 102, the first acquisition section 103, the communication state display section 104, the second acquisition section 105, the storage determination section 106, the first prohibition section 107, the number-of-apparatuses determination section 108, the communicability display section 109, the informing determination section 110, the second prohibition section 111, the informability setting section 112, and the like. The CPU 10 of the game apparatus 3 also executes the display control program according to the present invention stored in advance in the optical disk 4 (see FIG. 2) or the like, and thereby causes the flash memory 17 to function as functional sections of the registration information storage section 171, the informability storage section 172, and the like.

The communication partner storage section 81 (corresponding to communication partner storage means) is a functional section that stores therein a piece of individual information about each of a plurality of (three, in this example) game apparatuses 3 (3A, 3B, and 3C), in association with the pieces of individual information about others of the plurality of game apparatuses 3 that are communicating with each of the plurality of game apparatuses 3. Here, a piece of individual information is information for identifying a game apparatus on the network, and is an apparatus ID (Identification) assigned in advance to the game apparatus 3. The apparatus ID is, for example, any one of the IP address and the MAC address of an Ethernet (registered trademark) card of each game apparatus, and a unique number generated from these addresses.

The distinguishing information storage section 82 is a functional section that stores therein a piece of individual information capable of identifying each of a plurality of (three, in this example) game apparatuses 3 (3A, 3B, and 3C), in association with a piece of distinguishing information capable of distinguishing said each of the plurality of game apparatuses 3. Here, a piece of distinguishing information is information that is generated for a user to distinguish a computer, and is information such as name information corresponding to the user of the game apparatus 3 and face image information, which is an image representing a person's face corresponding to the user of the game apparatus 3.

The informing processing section 83 is a functional section that reads, in response to a request from the informing determination section 110, a piece of informability information stored in the informability storage section 172 of another game apparatus 3 (e.g., the game apparatus 3B) and outputs the piece of informability information to the informing determination section 110.

The registration information storage section 171 (corresponding to registration information storage means) is a functional section that stores therein pieces of individual information and pieces of distinguishing information, about other game apparatuses 3 (the game apparatuses 3B and 3C) registered by the user of the game apparatus 3A in advance as communication partners to communicate with via the Internet 9. In other words, the registration information storage section 171 stores pieces of individual information and pieces of distinguishing information that are capable of identifying and distinguishing other game apparatuses 3 (the game apparatuses 3B and 3C) registered in the game apparatus 3A as friends. Note that, as described above, in the present embodiment a piece of individual information is an apparatus ID assigned in advance to each game apparatus 3. Note that the pieces of individual information and the pieces of distinguishing information are transmitted to the server device 8 and are stored in the communication partner storage section 81, the distinguishing information storage section 82, and the like.

The informability storage section 172 (corresponding to informability storage means) is a functional section that stores therein each of the pieces of individual information stored in the registration information storage section 171, in association with a piece of informability information indicating whether or not it is permitted to inform another game apparatus 3 (e.g., the game apparatus 3B), which corresponds to said each of the pieces of individual information, of a piece of distinguishing information about yet another game apparatus 3 (e.g., the game apparatus 3C) that is communicating with the game apparatus 3A. In other words, a piece of informability information to be stored in an informability storage section 172 is, when a game apparatus 3 (the game apparatus 3A, in this example) including this informability storage section 172 has other game apparatuses 3 registered as friends, a piece of information indicating, on an apparatus-by-apparatus basis, whether or not it is permitted to inform another game apparatus 3 (e.g., the game apparatus 3B) included in the registered game apparatuses 3 of a piece of distinguishing information (name information, face image information, and the like, in this example) about yet another game apparatus 3 that is having a chat with the game apparatus 3A.

The connection determination section 101 (corresponding to connection determination means) is a functional section that determines whether or not another game apparatus 3 (e.g., the game apparatus 3B), which corresponds to one of the pieces of individual information stored in the registration information storage section 171, is connected to the Internet 9 (i.e., is having a chat).

The communication partner acquisition section 102 (corresponding to first acquisition means) is a functional section that acquires, when the connection determination section 101 has determined that the game apparatus 3B is connected to the Internet 9, the piece of individual information stored in the communication partner storage section 81 of the server device 8 and about yet another game apparatus 3 (e.g., the game apparatus 3C) that is communicating with the game apparatus 3B.

The first acquisition section 103 (corresponding to a part of first acquisition means) is a functional section that acquires, when the connection determination section 101 has determined that the game apparatus 3B is connected to the Internet 9, the piece of distinguishing information about yet another game apparatus 3 (e.g., the game apparatus 3C) that is communicating with the game apparatus 3B. Specifically, the first acquisition section 103 acquires the piece of distinguishing information about the game apparatus 3C from the distinguishing information storage section 82 of the server device 8, based on the piece of individual information about the game apparatus 3C acquired by the communication partner acquisition section 102.

The communication state display section 104 (corresponding to communication state display means) is a functional section that, based on the piece of distinguishing information about the game apparatus 3C acquired by the first acquisition section 103, visibly displays on the TV 2 connected to the game apparatus 3A the communication states of the game apparatus 3B and the game apparatus 3C associated with each other. For example, as shown in FIG. 15, the communication state display section 104 displays, as the communication states of the game apparatus 3B and the game apparatus 3C associated with each other, a friend display section 911 displaying the user information about the game apparatus 3B, a friend display section 914 displaying the user information about the game apparatus 3C, and a double line 916 representing that the game apparatus 3B and the game apparatus 3C are having a chat with each other.

Thus, the communication states of the game apparatus 3B and the game apparatus 3C associated with each other are visibly displayed based on the piece of distinguishing information about the game apparatus 3C, and therefore the user of the game apparatus 3A can easily decide whether or not to participate in the chat that is being held between the game apparatus 3B and the game apparatus 3C.

That is, the game apparatus 3B is a game apparatus 3 registered in the game apparatus 3A as a communication partner (a so-called "friend") to communicate with via the Internet 9. The game apparatus 3C is a game apparatus 3 that is a communication partner that is communicating with the game apparatus 3B. Accordingly, for example, the piece of distinguishing information capable of distinguishing the game apparatus 3C can be displayed in association with the game apparatus 3B, and therefore it is possible to understand information about the user of the game apparatus 3C, such as a name.

Figure 15:
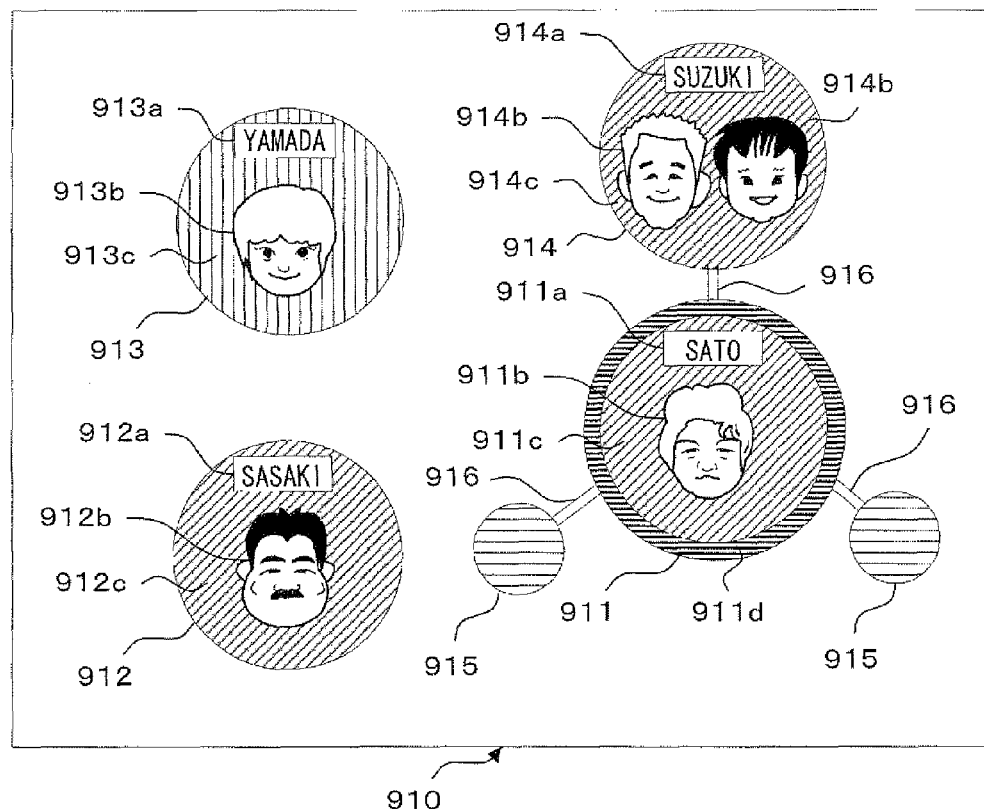
FIG. 15 is a screen diagram showing an example of a communication state display screen displayed, on a TV connected to a game apparatus having the player's name "Yamada", in accordance with the tables shown in FIG. 14.

In the present embodiment, as shown in FIG. 15, a case is described where the communication state display section 104 displays the friend display section 911 displaying the user information about the game apparatus 3B, the friend display section 914 displaying the user information about the game apparatus 3C, and the double line 916 representing that the game apparatus 3B and the game apparatus 3C are having a chat with each other; however, the communication state display section 104 may display, in another manner, the communication states of the game apparatus 3B and the game apparatus 3C associated with each other. For example, the user information about the game apparatus 3C may be displayed when the user of the game apparatus 3A has selected a mark representing the game apparatus 3B. In this case, the user information about the game apparatus 3C can be displayed on one screen, and therefore further detailed information can be displayed as the user information about the game apparatus 3C.

The communication state display section 104 also visibly displays the communication states of the game apparatus 3B and the game apparatus 3C associated with each other, based on the piece of distinguishing information about the game apparatus 3C acquired by the first acquisition section 103 and the piece of distinguishing information about the game apparatus 3B acquired by the second acquisition section 105.

Thus, for example, the piece of distinguishing information about the game apparatus 3B can be displayed in association with the piece of distinguishing information about the game apparatus 3C, and accordingly, the user of the game apparatus 3A can understand, for example, the user information about the game apparatus 3C, which is a partner that is having a chat with the game apparatus 3B, and therefore can more easily decide whether or not to participate in the chat that is being held between the game apparatus 3B and the game apparatus 3C.

The second acquisition section 105 (corresponding to second acquisition means) is a functional section that acquires the piece of distinguishing information about the game apparatus 3B. Specifically, similarly to the first acquisition section 103, the second acquisition section 105 acquires the piece of distinguishing information about the game apparatus 3B from the distinguishing information storage section 82 of the server device 8, based on the piece of individual information about the game apparatus 3B.

The storage determination section 106 (corresponding to storage determination means) is a functional section that determines whether or not the piece of individual information about the game apparatus 3C that is having a chat with the game apparatus 3B is stored in the registration information storage section 171. In other words, the storage determination section 106 determines whether or not the game apparatus 3C that is having a chat with the game apparatus 3B is registered as a friend of the game apparatus 3A.

The first prohibition section 107 is a functional section that prohibits, when the storage determination section 106 has determined that the piece of individual information about the game apparatus 3C is not stored in the registration information storage section 171, the communication state display section 104 from visibly displaying the communication states of the game apparatus 3B and the game apparatus 3C associated with each other. That is, when the game apparatus 3C is not a friend of the game apparatus 3A, the first prohibition section 107 prohibits the user information about the game apparatus 3C and the like from being displayed in the game apparatus 3A.

Thus, when the game apparatus 3C is not registered as a friend of the game apparatus 3A, the piece of distinguishing information about the game apparatus 3C, such as the user information, is prohibited from being displayed in the game apparatus 3A, and therefore it is possible to protect the privacy of the user of the game apparatus 3C.

In the present embodiment a case is described where, when the game apparatus 3C is not registered as a friend of the game apparatus 3A, the first prohibition section 107 prohibits the piece of distinguishing information about the game apparatus 3C from being displayed in the game apparatus 3A; however, it is only necessary that the first prohibition section 107 prohibit at least a part of the piece of distinguishing information about the game apparatus 3C from being displayed in the game apparatus 3A. For example, the first prohibition section 107 may prohibit the name information included in the piece of distinguishing information about the game apparatus 3C from being displayed, but may not prohibit the face image information included in the piece of distinguishing information about the game apparatus 3C from being displayed (i.e., at least the face image information about the game apparatus 3C may be displayed). In this case, the user can select items to be prohibited from being displayed so as to protect privacy, and therefore it is possible to improve the convenience of a game apparatus 3.

The number-of-apparatuses determination section 108 (corresponding to number-of-apparatuses determination means) is a functional section that determines whether or not the number of game apparatuses 3 that are having a chat with the game apparatus 3B is equal to or smaller than a predetermined number (two, in this example).

The communicability display section 109 (corresponding to communicability display means) is a functional section that visibly displays, when the number-of-apparatuses determination section 108 has determined that the number is equal to or smaller than a predetermined number (two, in this example), that it is possible to chat with the game apparatus 3B. When the number-of-apparatuses determination section 108 has determined that the number is equal to or smaller than a predetermined number (two, in this example), the communicability display section 109 also visibly displays the number of game apparatuses 3 that can communicate with the game apparatus 3B.

For example, as shown in FIG. 15, when the number-of-apparatuses determination section 108 has determined that the number is equal to or smaller than a predetermined number (two, in this example), the communicability display section 109 displays vacancy display sections 915 displaying the number of (two, in this example) game apparatuses 3 that can participate in the chat with the game apparatus 3B. In the example of FIG. 15, the game apparatus 3B is having a chat with one game apparatus 3, and two vacancy display sections 915 are displayed, and thereby it is understood that two more game apparatuses 3 can participate in this chat.

Thus, based on the presence or absence of the vacancy display section 915, the user of the game apparatus 3A can easily decide whether or not it is possible to participate in the chat with the game apparatus 3B. In addition, based on the number of vacancy display sections 915, the user of the game apparatus 3A can easily understand the number of game apparatuses 3 that can participate in the chat with the game apparatus 3B.

In the present embodiment a case is described where, as shown in FIG. 15, the communicability display section 109 displays, with the presence or absence of the vacancy display section 915, whether or not it is possible to have a chat with the game apparatus 3B; however, the communicability display section 109 may display, in another manner, whether or not it is possible to have a chat with the game apparatus 3B. For example, the communicability display section 109 may display, with character information, whether or not it is possible to have a chat with the game apparatus 3B.

In the present embodiment a case is described where, as shown in FIG. 15, the communicability display section 109 displays, with the number of vacancy display sections 915, the number of game apparatuses 3 that can participate in the chat with the game apparatus 35; however, the communicability display section 109 may display, in another manner, the number of game apparatuses 3 that can participate in the chat with the game apparatus 3B. For example, the communicability display section 109 may display, with character information, the number of game apparatuses 3 that can participate in the chat with the game apparatus 3B.

The informing determination section 110 (corresponding to informing determination means) is a functional section that determines, when the connection determination section 101 has determined that the game apparatus 3B is connected to the Internet 9, whether or not it is permitted, in the game apparatus 3B, to inform the game apparatus 3A of the piece of distinguishing information about the game apparatus 3C. In other words, the informing determination section 110 determines whether or not it is set in the game apparatus 3B that it is permitted to inform the game apparatus 3A of the communication state of the game apparatus 3B (i.e., the user information about the game apparatus 3C that is a communication partner).

Specifically, the informing determination section 110 determines, based on the piece of informability information stored in the informability storage section 172 of the game apparatus 3B and about the game apparatus 3A, whether or not it is permitted to inform the game apparatus 3A of the piece of distinguishing information about the game apparatus 3C. Here, the informing determination section 110 acquires, via the informing processing section 83 of the server device 8, the piece of informability information stored in the informability storage section 172 of the game apparatus 3B and about the game apparatus 3A. That is, the informing determination section 110 requests from the informing processing section 83 of the server device 8 the piece of informability information stored in the informability storage section 172 of the game apparatus 3B and about the game apparatus 3A. When having received this request, the informing processing section 83 requests the game apparatus 3B to transmit to the informing processing section 83 the piece of informability information stored in the informability storage section 172 of the game apparatus 3B and about the game apparatus 3A.

When having received the piece of informability information about the game apparatus 3A from the game apparatus 3B, the informing processing section 83 transfers the received piece of informability information to the game apparatus 3A.

The second prohibition section 111 is a functional section that prohibits, when the informing determination section 110 has determined that the informing is not permitted, the communication state display section 104 from visibly displaying the communication states of the game apparatus 3B and the game apparatus 3C associated with each other. In other words, when it is not permitted, in the game apparatus 3B, to inform the game apparatus 3A of the communication state of the game apparatus 3B (i.e., the user information about the game apparatus 3C that is a communication partner), the second prohibition section 111 prohibits the communication state of the game apparatus 3B from being displayed.

Thus, when it is not permitted, in the game apparatus 3B, to inform the game apparatus 3A of the communication state of the game apparatus 3B, the communication states of the game apparatus 3B and the game apparatus 3C associated with each other are not displayed, and therefore it is possible to protect the privacy of the user of the game apparatus 3C. In addition, it is determined, based on the piece of informability information stored in the informability storage section 172 of the game apparatus 3B and about the game apparatus 3A, whether or not it is permitted to inform the game apparatus 3A of the communication state of the game apparatus 3B, and therefore it is possible to determine, with a simple structure, whether or not it is permitted to inform the game apparatus 3A of the communication state of the game apparatus 3B.

In the present embodiment a case is described where, when it is not permitted to inform the game apparatus 3A of the communication state of the game apparatus 3B, the second prohibition section 111 prohibits the piece of distinguishing information about the game apparatus 3C from being displayed in the game apparatus 3A; however, it is only necessary that the second prohibition section 111 prohibit at least a part of the piece of distinguishing information about the game apparatus 3C from being displayed in the game apparatus 3A. For example, the second prohibition section 111 may prohibit the name information included in the piece of distinguishing information about the game apparatus 3C from being displayed, but may not prohibit the face image information included in the piece of distinguishing information about the game apparatus 3C from being displayed (i.e., at least the face image information about the game apparatus 3C may be displayed). In this case, the user can select items to be prohibited from being displayed so as to protect privacy, and therefore it is possible to improve the convenience of a game apparatus 3.

In the present embodiment a case is described where the second prohibition section 111 determines, based on the piece of informability information stored in the informability storage section 172 of the game apparatus 3B, whether or not it is permitted to inform the game apparatus 3A of the communication state of the game apparatus 3B; however, as described below with reference to FIG. 21, the second prohibition section 111 may determine, based on the pieces of informability information stored in the informability storage sections 172 of the game apparatus 3A and the game apparatus 3B, whether or not it is permitted to inform the game apparatus 3A of the communication state of the game apparatus 3B.

Alternatively, the second prohibition section 111 may determine, based on the pieces of informability information stored in the informability storage sections 172 of the game apparatus 3B and the game apparatus 3C, whether or not it is permitted to inform the game apparatus 3A of the communication state of the game apparatus 3B. That is, for example, only when the informability storage section 172 of the game apparatus 3B has stored therein the piece of informability information indicating that it is permitted to inform the game apparatus 3A of the communication state of the game apparatus 3B and also the informability storage section 172 of the game apparatus 3C has stored therein the piece of informability information indicating that it is permitted to inform the game apparatus 3B of the communication state of the game apparatus 3C, the second prohibition section 111 may determine that it is permitted to inform the game apparatus 3A of the communication state of the game apparatus 3B. In this case, it is possible to protect the privacy of the user of the game apparatus 3C with more certainty.

The informability setting section 112 (corresponding to informability setting means) is a functional section that receives an operation input from the controller 7 of the game apparatus 3A, sets, based on the received operation input, a piece of informability information with respect to each piece of individual information stored in the registration information storage section 171, and records the piece of informability information in the informability storage section 172. A piece of informability information is thus set based on the operation input from a controller 7, and therefore it is possible to easily set a piece of informability information. Note that although the functional structure of the game apparatus 3A is described above, the game apparatuses 3B and 3C also have the same functional structures as that of the game apparatus 3A, and therefore will not be described.

Figure 10:
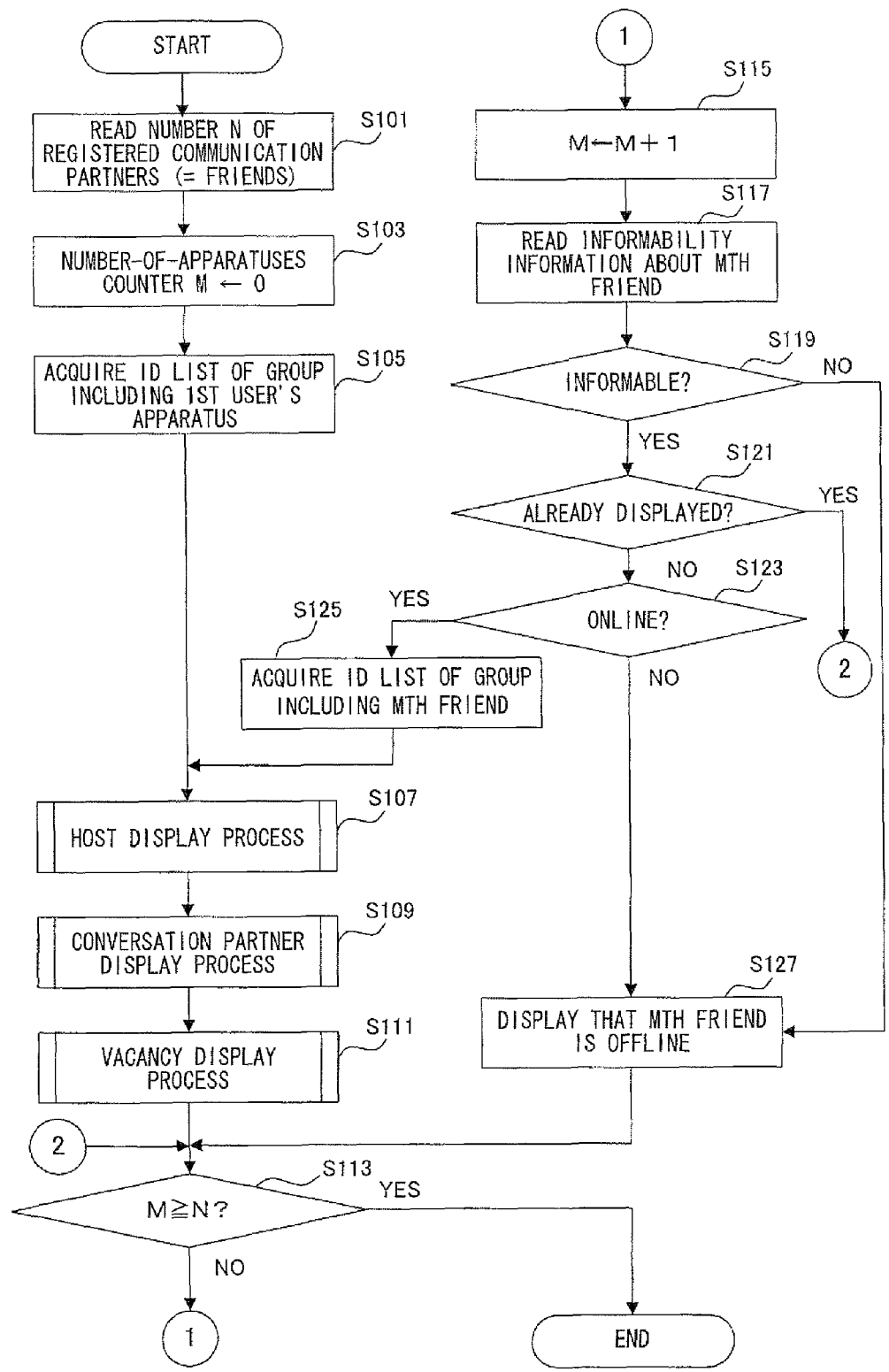
FIG. 10 is a flow chart showing an example of the operation of a display control device according to the present invention.

FIG. 10 is a flow chart showing an example of the operation of a display control device according to the present invention. Note that, here, a case is described where the game apparatus 3 is the game apparatus 3A and the registration information storage section 171 has stored therein pieces of individual information capable of identifying other game apparatuses 3 registered in the game apparatus 3A in advance as friends, while the informability storage section 172 has stored therein a piece of informability information, which has been set in advance by the informability setting section 112 with respect to each of the pieces of individual information stored in the registration information storage section 171, in association with the corresponding piece of individual information. Also a case is described where the communication partner storage section 81 of the server device 8 has stored therein in advance apiece of individual information capable of identifying each of a plurality of game apparatuses 3, in association with the pieces of individual information about other of the plurality of game apparatuses 3 that are communicating with said each of the plurality of game apparatuses 3, while the distinguishing information storage section 82 has stored therein a piece of individual information capable of identifying each of a plurality of game apparatuses 3, in association with a piece of distinguishing information capable of distinguishing said each of the plurality of game apparatuses 3. Note that the game apparatus 3A that corresponds to a first user's apparatus is connected in advance to the server device 8 via the Internet 9. The process performed by the game apparatus 3A will be described below with reference to FIG. 10.

First, in step S101 the connection determination section 101 reads the number N (i.e., the number of the game apparatuses 3 registered in the game apparatus 3A as friends) of the pieces of individual information stored in the registration information storage section 171. In step S103 the communication partner acquisition section 102 initializes the value of a number-of-apparatuses counter M, which counts the number of game apparatuses 3, to be "0". In step S105 the communication partner acquisition section 102 reads from the communication partner storage section 81 of the server device 8 a list (hereinafter referred to as an "ID list") of the apparatus IDs (i.e., the pieces of individual information) of all of the game apparatuses 3 included in the group in which the game apparatus 3A that is the first user's apparatus is having a chat.

When the process of step S105 is completed, or when the process of step S125 is completed, in step S107 the communication state display section 104 and the like perform a host display process, which is a process of displaying on the TV 2 connected to the game apparatus 3A the game apparatus 3 that corresponds to a virtual "host" among the ID list read in step S105 (or the ID list read in step S125). Here, the "host" refers to, of two game apparatuses 3 that have formed a group in which a chat is being held, the game apparatus 3 that has applied for a chat.

In step S109 the communication state display section 104 and the like perform a conversation partner display process, which is a process of displaying on the TV 2 connected to the game apparatus 3A the game apparatuses 3 that, among the ID list read in step S105 (or the ID list read in step S125), correspond to conversation partners (i.e., chat partners) of the game apparatus 3 that corresponds to the virtual "host". In step S111 the communicability display section 109 and the like perform a vacancy display process, which is a process of displaying on the TV 2 connected to the game apparatus 3A virtual "vacancies" that, among the ID list read in step S105 (or the ID list read in step S125), correspond to the number of game apparatuses 3 that are potential conversation partners (i.e., chat partners) of the "host" game apparatus 3.

When the process of step S111 is completed, or when the process of step S127 is completed, or when it is "YES" in step S121, in step S113 the connection determination section 101 determines whether or not the value of the number-of-apparatuses counter M is equal to or greater than the number N read in step S101. When it is determined that the value of the number-of-apparatuses counter M is equal to or greater than the number N ("YES" in step S113), the process ends. When it is determined that the value of the number-of-apparatuses counter M is less than the number N ("NO" in step S113), the process proceeds to step S115.

In step S115 the connection determination section 101 increments the value of the number-of-apparatuses counter M by only "1". In step S117 the informing determination section 110 reads via the informing processing section 83 of the server device 8 the piece of informability information about the game apparatus 3A and stored in the informability storage section 172 of a game apparatus 3 that is an Mth friend among the game apparatuses 3 registered in the game apparatus 3A as friends. In step S119 the second prohibition section 111 determines whether or not the piece of informability information read in step S117 indicates informable. When the piece of informability information read in step S117 indicates informable ("YES" in step S119), the process proceeds to step S121. When the piece of informability information read in step S117 indicates uninformable ("NO" in step S119), the process proceeds to step S127.

In step S121 the communication state display section 104 determines whether or not the Mth friend is already displayed on the TV 2 connected to the game apparatus 3A. Here, the case where the Mth friend is already displayed on the TV 2 refers to the case where the ID list read in step S105 (or the ID list read in step S125) includes the apparatus ID (i.e., the piece of individual information) that corresponds to the Mth friend. When it is determined that the Mth friend is already displayed on the TV 2 ("YES" in step S121), the process proceeds to step S113. When it is determined that the Mth friend is not already displayed on the TV 2 ("NO" in step S121), in step S123 the connection determination section 101 determines whether or not the Mth friend is online (whether or not the Mth friend is connected to the server device 8 via the Internet 9). When it is determined that the Mth friend is not online ("NO" in step S121), the process proceeds to step S127. When it is determined that the Mth friend is online ("YES" in step S121), the process proceeds to step S125

When it is "YES" in step S123, the communication partner acquisition section 102 reads from the communication partner storage section 81 of the server device 8 the list (i.e., the ID list) of the apparatus IDs (i.e., the pieces of individual information) of all of the game apparatuses 3 included in the group in which the Mth friend is having a chat. When the process of step S125 is completed, the process proceeds to step S107.

When it is "NO" in step S119, or when it is "NO" in step S123, in step S127 the communication state display section 104 displays that the Mth friend is offline. Here, in order to represent that the Mth friend is offline, for example, the background color (i.e., the color of the attribute display section described below) of the area where the name and the face image of the Mth friend are displayed is displayed in gray (displayed with horizontal line shading, in the screen diagrams shown in FIGS. 15 through 20) When the process of step S127 is completed, the process proceeds to step S113.

Figure 11:
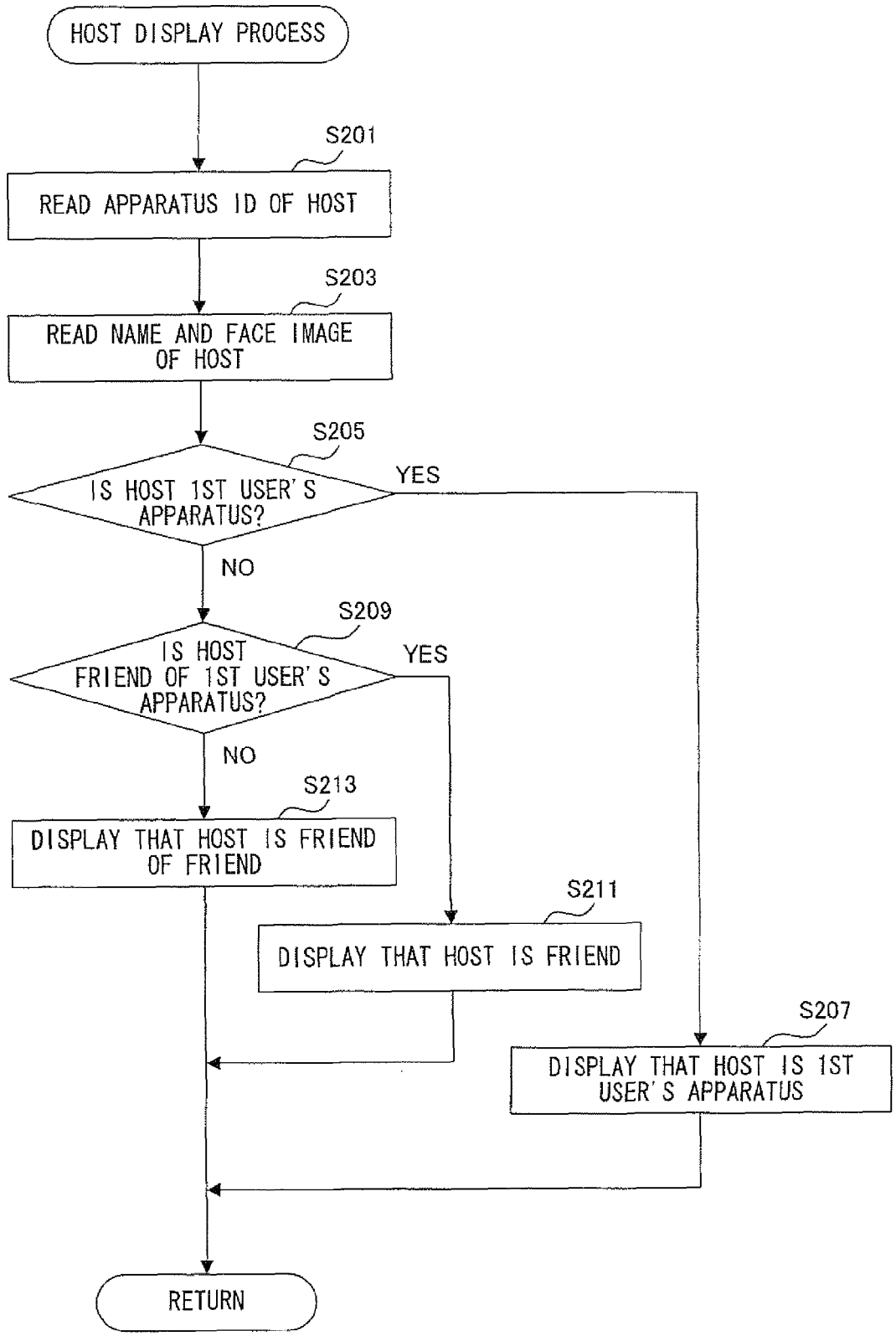
FIG. 11 is a detailed flow chart showing an example of a host display process performed in step S107 of the flow chart shown in FIG. 10.

FIG. 11 is a detailed flow chart showing an example of the host display process performed in step S107 of the flow chart shown in FIG. 10. First, in step S201 the communication state display section 104 reads, from the ID list read in step S105 shown in FIG. 10 (or the ID list read in step S125 shown in FIG. 10), the apparatus ID (i.e., the piece of individual information) that corresponds to the "host". In step S203 the communication state display section 104 reads from the distinguishing information storage section 82 of the server device 8 the name information and the face image information (i.e., the piece of distinguishing information) that correspond to the apparatus ID read in step S201.

In step S205 the communication state display section 104 determines whether or not the game apparatus 3 that corresponds to the "host" is the game apparatus 3A that corresponds to the first user's apparatus. Note that this determination is made based on whether or not the apparatus ID read in step S201 and corresponding to the "host" matches with the apparatus ID included in the user information stored in advance in the game apparatus 3A. When it is determined that the "host" is the first user's apparatus ("YES" in step S205), the process proceeds to step S207. When it is determined that the "host" is not the first user's apparatus ("NO" in step S205), the process proceeds to step S209.

In step S209 the communication state display section 104 determines whether or not the game apparatus 3 that corresponds to the "host" is a game apparatus 3 registered as a friend of the first user's apparatus. Note that this determination is made based on whether or not the apparatus ID read in step S201 and corresponding to the "host" matches with any one of the apparatus IDs of the friends stored in the registration information storage section 171 of the game apparatus 3A. When it is determined that the "host" is a friend of the first user's apparatus ("YES" in step S209), the process proceeds to step S211. When it is determined that the "host" is not a friend of the first user's apparatus ("NO" in step S209), the process proceeds to step S213.

In step S207 the communication state display section 104 displays that the "host" is the first user's apparatus, and the process returns to step S109 of the flow chart shown in FIG. 10. Here, in order to represent that the "host" is the first user's apparatus, for example, the background color (the color of the attribute display section described below) of the area where the name and the face image of the first user's apparatus are displayed is displayed in red (displayed with vertical line shading, in the screen diagrams shown in FIGS. 15 through 20). Further, in order to represent that an apparatus is the "host", for example, the circumference of the area where the name and the face image of the apparatus are displayed has a yellow (displayed with narrowly-spaced horizontal line shading, in the screen diagrams shown in FIGS. 15 through 20) circle (i.e., the host mark described below).

In step S211 the communication state display section 104 displays that the "host" is a friend of the first user's apparatus, and the process returns to step S109 of the flow chart shown in FIG. 10. Here, in order to represent that the "host" is a friend of the first user's apparatus, for example, the background color (i.e., the color of the attribute display section described below) of the area where the name and the face image of the apparatus are displayed is displayed in blue (displayed with shading of diagonal lines from top right to bottom left, in the screen diagrams shown in FIGS. 15 through 20).

In step S213 the communication state display section 104 displays that the "host" is a friend of a friend of the first user's apparatus, and the process returns to step S109 of the flow chart shown in FIG. 10. Here, the "friend of a friend of the first user's apparatus" refers to another game apparatus 3 whose apparatus ID is registered as a friend in the registration information storage section 171 of yet another game apparatus 3 whose apparatus ID is registered as a friend in the registration information storage section 171 of the game apparatus 3A that is the first user's apparatus. Further, in order to represent that the "host" is a friend of a friend of the first user's apparatus, for example, the background color (i.e., the color of the attribute display section described below) of the area where the name and the face image of the apparatus are displayed is displayed in yellow green (displayed with grid shading of two types of diagonal lines, in the screen diagram showing FIG. 19).

Figure 12:
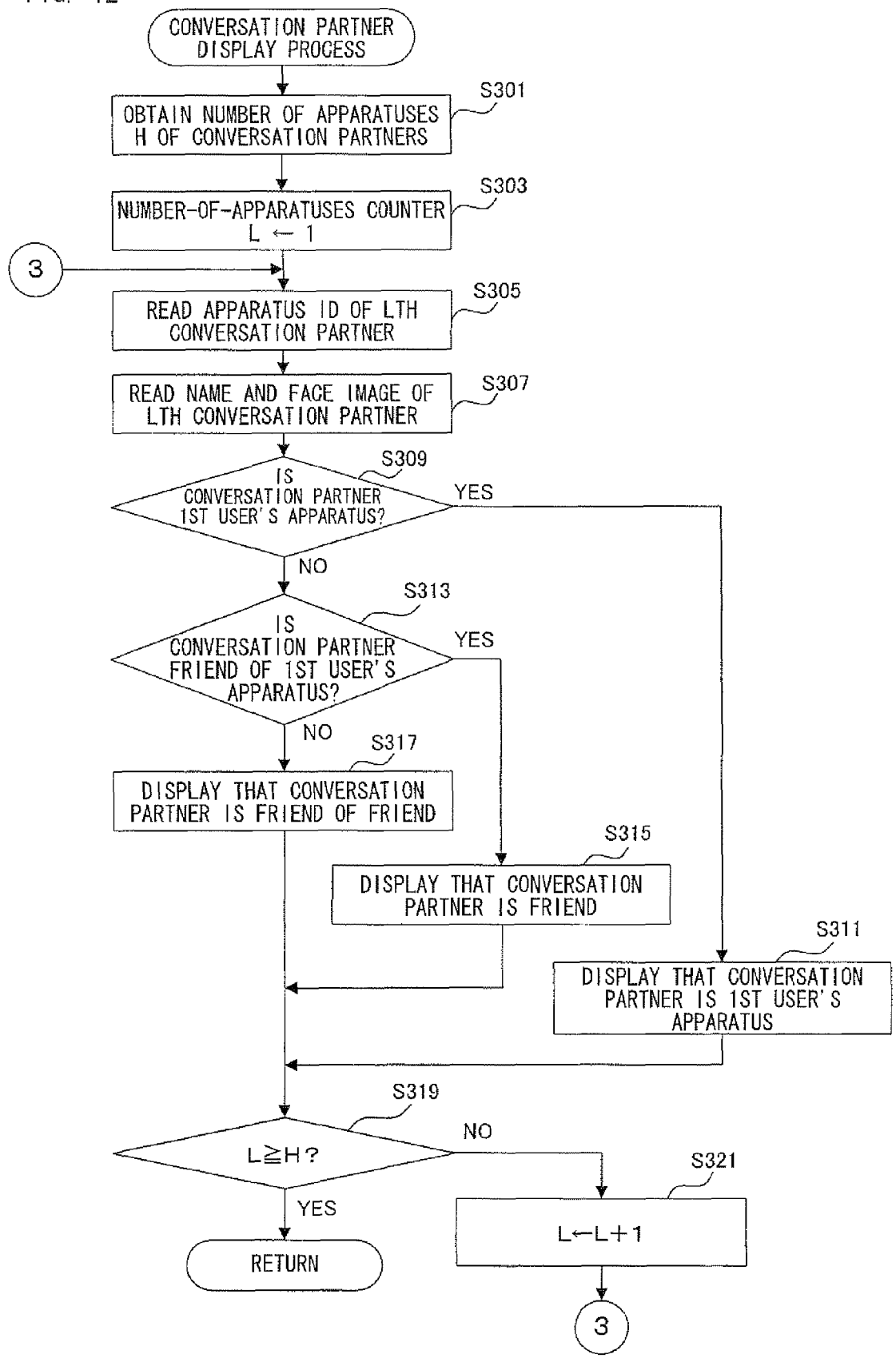
FIG. 12 is a detailed flow chart showing an example of a conversation partner display process performed in step S109 of the flow chart shown in FIG. 10.

FIG. 12 is a detailed flow chart showing an example of the conversation partner display process performed in step S109 of the flow chart shown in FIG. 10. First, in step S301 the communication state display section 104 obtains the number of apparatuses H of the conversation partners of the "host" from the ID list read in step S105 shown in FIG. 10 (or the ID list read in step S125 shown in FIG. 10). For example, when two game apparatuses 3 are having a chat with each other, the number of apparatuses H of the conversation partners is "1"; when three game apparatuses 3 are having a chat with each other, the number of apparatuses H of the conversation partners is "2"; and when four game apparatuses 3 are having a chat with each other, the number of apparatuses H of the conversation partners is "3". In step S303 the communication state display section 104 initializes a number-of-apparatuses counter L, which counts the number of the apparatuses of the conversation partners, to be "1". When the process of step S303 is completed, or when the process of step S321 is completed, in step S305 the communication state display section 104 reads the apparatus ID of an Lth conversation partner from the ID list read in step S105 shown in FIG. 10 (or the ID list read in step S125 shown in FIG. 10).

Next, in step S307 the communication state display section 104 reads from the distinguishing information storage section 82 of the server device 8 the name information and the face image information (i.e., the piece of distinguishing information) that correspond to the apparatus ID read in step S305. In step S309 the communication state display section 104 determines whether or not the game apparatus 3 that corresponds to the Lth conversation partner is the game apparatus 3A that corresponds to the first user's apparatus. Note that this determination is made based on whether or not the apparatus ID of the Lth conversation partner read in step S305 matches with the apparatus ID included in the user information stored in advance in the game apparatus 3A. When it is determined that the game apparatus 3 that corresponds to the Lth conversation partner is the first user's apparatus ("YES" in step S309), the process proceeds to step S311. When it is determined that the game apparatus 3 that corresponds to the Lth conversation partner is not the first user's apparatus ("NO" in step S309), the process proceeds to step S313.

In step S313 the communication state display section 104 determines whether or not the game apparatus 3 that corresponds to the Lth conversation partner is a game apparatus 3 registered as a friend of the first user's apparatus. Note that this determination is made based on whether or not the apparatus ID read in step S305 and corresponding to the Lth conversation partner matches with any one of the apparatus IDs of the friends stored in the registration information storage section 171 of the game apparatus 3A. When it is determined that the Lth conversation partner is a friend of the first users apparatus ("YES" in step S313), the process proceeds to step S315. When it is determined that the Lth conversation partner is not a friend of the first user's apparatus ("NO" in step S313), the process proceeds to step S317.

In step S311 the communication state display section 104 displays that the Lth conversation partner is the first user's apparatus, and the process proceeds to step S319. In step S315 the communication state display section 104 displays that the Lth conversation partner is a friend of the first user's apparatus, and the process proceeds to step S319. In step S317 the communication state display section 104 displays that the Lth conversation partner is a friend of a friend of the first user's apparatus, and the process proceeds to step S319. In step S319 the communication state display section 104 determines whether or not the value of the number-of-apparatuses counter L is equal to or greater than the number of apparatuses H read in step S301. When it is determined that the value of the number-of-apparatuses counter L is equal to or greater than the number of apparatuses H ("YES" in step S319), the process returns to step S11 shown in FIG. 10. When it is determined that the value of the number-of-apparatuses counter L is less than the number of apparatuses H ("NO" in step S319), the process proceeds to step S321. In step S321 the communication state display section 104 increments the value of the number-of-apparatuses counter L by only "1", and the process returns to step S305.

Figure 13:
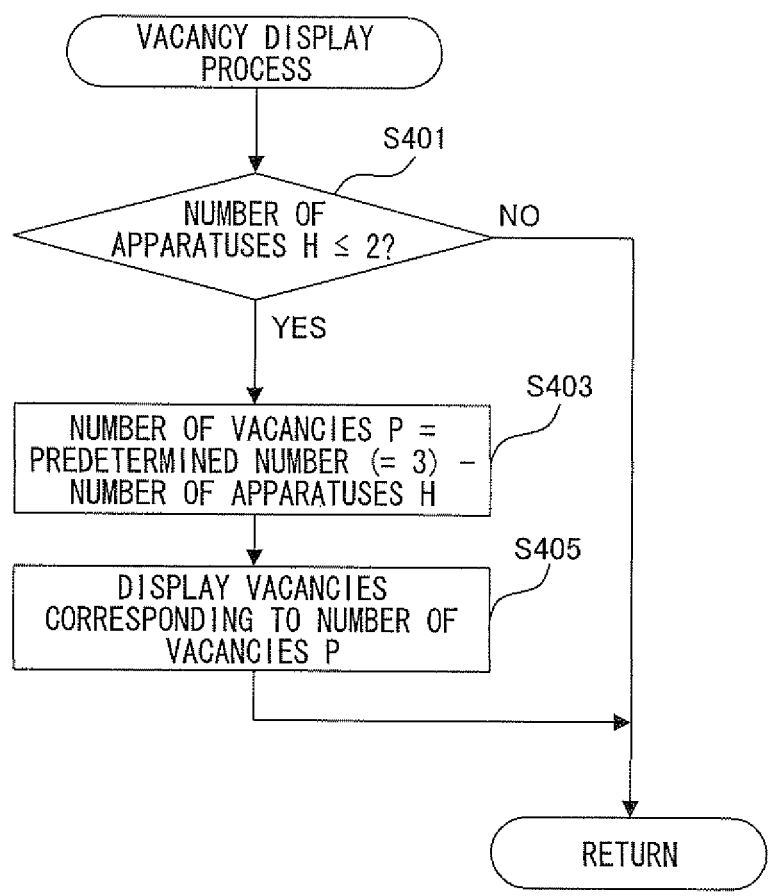
FIG. 13 is a detailed flow chart showing an example of a vacancy display process performed in step S111 of the flow chart shown in FIG. 10.

FIG. 13 is a detailed flow chart showing an example of the vacancy display process performed in step S111 of the flow chart shown in FIG. 10. Note that in the present embodiment it is assumed that up to four game apparatuses 3 have a chat with each other. In step S401 the communicability display section 109 determines whether or not the number of apparatuses H (i.e., the number of the game apparatuses 3 that correspond to the conversation partners of the "host") obtained in step S301 shown in FIG. 12 is less than "2". When it is determined that the number of apparatuses H is less than "2" ("YES" in step S401), the process proceeds to step S403. When it is determined that the number of apparatuses H is equal to or greater than "2" ("NO" in step S401) the process returns to step S113 shown in FIG. 10.

In step S403 the communicability display section 109 obtains the number of vacancies P using the following equation (1).

number of vacancies P=predetermined number (three, in this example)−number of apparatuses H    (1)

Note that the number of vacancies P can be obtained from equation (1) since, as described above, in the present embodiment it is assumed that up to four game apparatuses 3 have a chat with each other.

Then the communicability display section 109 displays on the TV 2 connected to the game apparatus 3A the vacancies corresponding to the number of vacancies P obtained in step S403, and the process returns to step S113 shown in FIG. 10. Here, in order to represent a vacancy, for example, a vacancy mark 915 is displayed in association with the representation of the "host" as shown in FIGS. 15 through 20. Note that the "host" is represented by a host mark 911d or the like in the screen diagrams shown in FIGS. 15 through 20. Further, the state of being associated is represented by a double line 916 in the screen diagrams shown in FIGS. 15 through 20. Furthermore, a vacancy mark is displayed as a gray (displayed with horizontal line shading, in the screen diagrams shown in FIGS. 15 through 20) vacancy mark 915 or the like.

FIG. 14 is tables showing an example of a variety of information stored in the game apparatus 3 and the server device 8. In this example, the descriptions will be given, taking as an example a case where the game apparatus 3 is the game apparatus 3A. (a) of FIG. 14 is a table showing an example of the user information stored in the game apparatus 3A that corresponds to the first user's apparatus. As the user information, for example, the apparatus ID "3333" and the player's name "Yamada" are stored. (b) of FIG. 14 is a table showing an example of registration information about friends and stored in the registration information storage section 171 and the informability storage section 172 of the game apparatus 3A that corresponds to the first user's apparatus. As the registration information, the apparatus IDs, the players' names, the IP addresses, and the pieces of informability information, of the game apparatuses 3 registered as friends are stored. Here, three game apparatuses 3 having the players' names "Sato", "Sasaki", and "Suzuki" are registered as friends of the game apparatus 3A.

(c) of FIG. 14 is a table showing an example of the ID list that is stored in the communication partner storage section 81 of the server device 8 at the point in time when the game apparatus 3A is connected to the server device 8 via the Internet 9. The ID list includes the group's name of a group in which a chat is held, the apparatus IDs of the game apparatuses 3 consisting of the group, and the players' names that correspond to the apparatus IDs. Here, as shown in the table, in a group 1 two game apparatuses 3 having the players' names "Sato" and "Suzuki" are having a chat with each other.

(d) of FIG. 14 is a table showing an example of the ID list in the case where the game apparatus 3 having the player's name "Sasaki" has participated in the chat of the group 1 shown in (c) of FIG. 14. Similarly to (c) of FIG. 14, the ID list includes the group's name of a group in which a chat is held, the apparatus Ins of the game apparatuses 3 consisting of the group, and the players' names that correspond to the apparatus IDs. Here, the game apparatus 3 having the player's name "Sasaki" has joined the group 1, and three game apparatuses 3 are having a chat with each other.

FIG. 15 is a screen diagram showing an example of a communication state display screen displayed, on the TV 2 connected to the game apparatus 3A having the player's name "Yamada", in accordance with the tables of FIG. 14. In a communication state display screen 910, a first user's apparatus display section 913 is displayed on the top left of the screen, a friend display section 912 is displayed on the bottom left of the screen, and friend display sections 911 and 914 are displayed on the right of the screen. The first user's apparatus display section 913 is a display section that displays the information about the game apparatus 3A that is the first user's apparatus, and includes a player's name display section 913a, a face image display section 913b, and an attribute display section 913c.

The player's name display section 913a is a display section that displays the player's name registered as the user information about the game apparatus 3A, and here displays "Yamada" based on the user information shown in (a) of FIG. 14. The face image display section 913b is a display section that displays the face image registered as the user information about the game apparatus 3A. Note that for one game apparatus 3 a plurality of face images can be set in accordance with the number of the users. For example, a face image display section 914b of the friend display section 914 displays two face images so that it is understood that the game apparatus 3 that corresponds to the friend display section 914 is used by two users.

The attribute display section 913c is a display section that displays, by color information, the attribute of whether the corresponding game apparatus 3 is the game apparatus 3A that corresponds to the first user's apparatus, is a game apparatus 3 that corresponds to a friend of the first user's apparatus, or is a game apparatus 3 that corresponds to a friend of a friend of the first user's apparatus. For example, when the corresponding game apparatus 3 is the game apparatus 3A that corresponds to the first user's apparatus, the attribute display section 913c is displayed in red (displayed with vertical line shading, in the screen diagrams shown in FIGS. 15 through 20). When the corresponding game apparatus 3 is a game apparatus 3 that corresponds to a friend of the first user's apparatus, the attribute display section 913c is displayed in blue (displayed with shading of diagonal lines from top right to bottom left, in the screen diagrams shown in FIGS. 15 through 20). When the corresponding game apparatus 3 is a game apparatus 3 that corresponds to a friend of a friend of the first user's apparatus, the attribute display section 913c is displayed in yellow green (displayed with grid shading of two types of diagonal lines, in the screen diagram shown in FIG. 19).

The friend display section 912 is a display section that displays the information about the game apparatus 3 operated by the user using the player's name "Sasaki". Similarly to the first user's apparatus display section 913, the friend display section 912 includes a player's name display section 912a, a face image display section 912b, and an attribute display section 912c. However, since the game apparatus 3 operated by the user using the player's name "Sasaki" is a game apparatus 3 that corresponds to a friend of the first user's apparatus, the attribute display section 912c is displayed in blue (displayed with shading of diagonal lines from top right to bottom left, in the screen diagrams shown in FIGS. 15 through 20).

The friend display sections 911 and 914 are display sections that display the information about the game apparatuses 3 operated by the users using the players' names "Sato" and "Suzuki", and similarly to the friend display section 912, include player's name display sections 911a and 914a, face image display sections 911b and 914b, and attribute display sections 911c and 914c, respectively. Further, between the friend display section 911 and the friend display section 914, a double line 916 is displayed that represents that these game apparatuses 3 are chat partners. Furthermore, in the circumference of the friend display section 911, a host mark 911d is displayed that represents that this game apparatus 3 is a host.

In addition, to the bottom left and the bottom right of the friend display section 911, vacancy marks 915 connected thereto via double lines 916 are displayed so as to represent that vacancies are present. Since only two vacancy marks 915 are displayed, it is understood that two vacancies are present.

Figure 16:
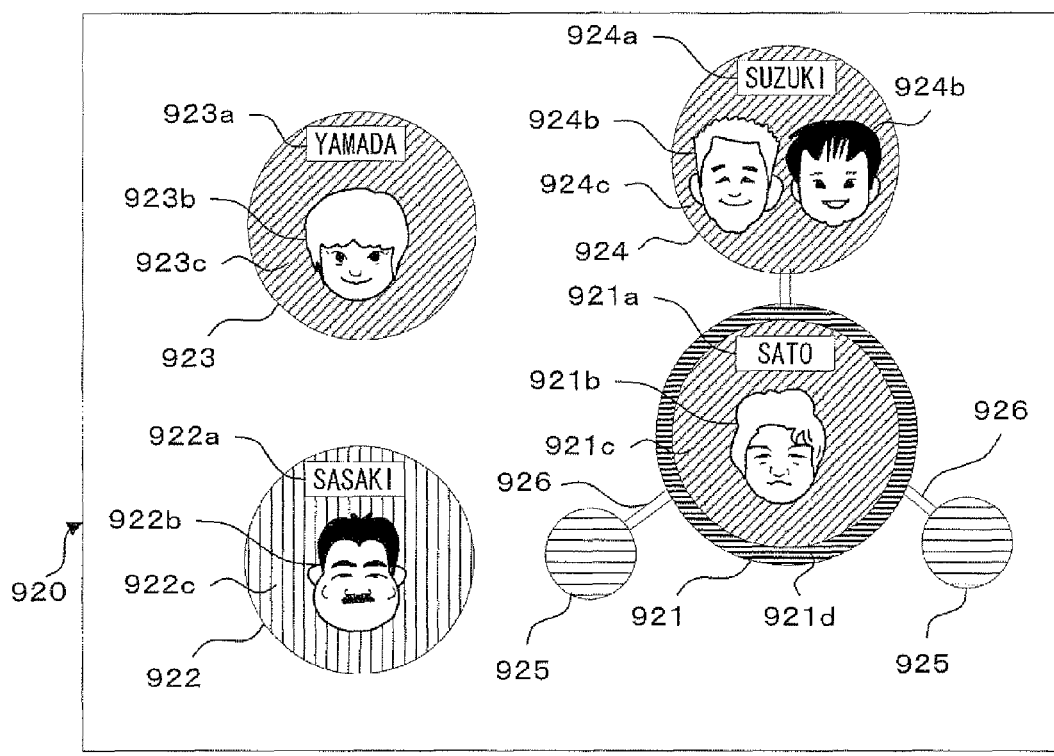
FIG. 16 is a screen diagram showing an example of a communication state display screen displayed, on a TV connected to a game apparatus having the player's name "Sasaki", in accordance with the tables shown in FIG. 14.

FIG. 16 is a screen diagram showing an example of a communication state display screen displayed, on the TV 2 connected to the game apparatus 3 having the player's name "Sasaki", in accordance with the tables of FIG. 14. In a communication state display screen 920, a friend display section 923 is displayed on the top left of the screen, a first user's apparatus display section 922 is displayed on the bottom left of the screen, and friend display sections 921 and 924 are displayed on the right of the screen. In comparison to FIG. 15, the display section that corresponds to the game apparatus 3 having the player's name "Sasaki" and is displayed as the friend display section 912 in FIG. 15, is displayed as the first user's apparatus display section 922 in FIG. 16. On the other hand, the display section that corresponds to the game apparatus 3A having the player's name "Yamada" and is displayed as the first user's apparatus display section 913 in FIG. 15, is displayed as the friend display section 923 in FIG. 16. Note that here, the game apparatuses 3 having the players' names "Suzuki" and "Sato" are registered as friends also in the game apparatus 3 having the player's name "Sasaki", and therefore are displayed in the friend display sections 924 and 921, respectively.

Figure 17:
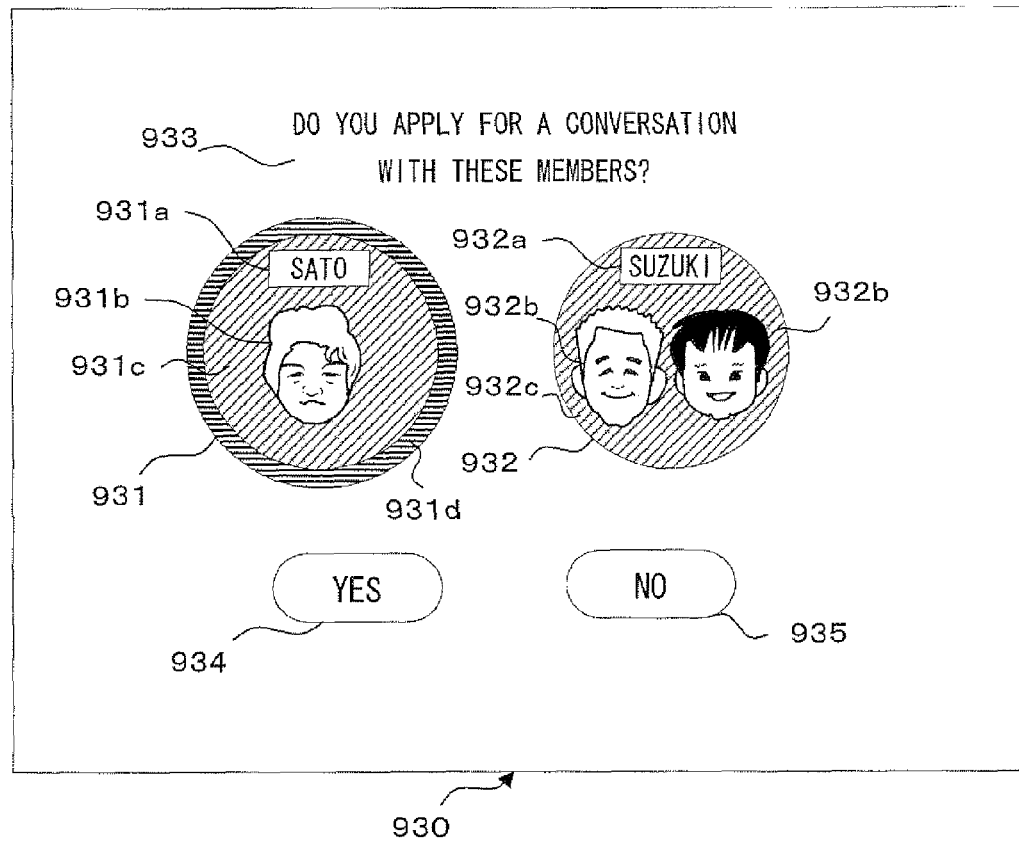
FIG. 17 is a screen diagram showing an example of a participation application screen displayed on the TV connected to the game apparatus having the player's name "Sasaki", in the case where the game apparatus having the player's name "Sasaki" applies for participation in a chat held in a group 1.

FIG. 17 is a screen diagram showing an example of a participation application screen displayed on the TV 2 connected to the game apparatus 3 having the player's name "Sasaki", in the case where the player's name "Sasaki" applies for participation in the chat held in the group 1. In a participation application screen 930, friend display sections 931 and 932 are displayed in a generally central portion of the screen, a message display section 933 is displayed in the top portion of the screen, and buttons 934 and 935 are displayed in the bottom portion of the screen.

The friend display sections 931 and 932 are display sections that display members already included in the group that the game apparatus 3 having the player's name "Sasaki" applies to join. Similarly to the friend display sections 911 and 914 shown in FIG. 15, the friend display sections 931 and 932 include player's name display sections 931a and 932a, face image display sections 931b and 932b, and attribute display sections 931c and 932c, respectively, and also a host mark 931d. In the message display section 933, a message is displayed such as: "Do you apply for a conversation with these members?", so as to urge confirmation as to whether or not to apply for participation in the chat held in the group 1. A Yes button 934 is a button to be selected by the user of the game apparatus 3 having the player's name "Sasaki" when the user applies, and a No button 935 is a button to be selected by the user of the game apparatus 3 having the player's name "Sasaki" when the user does not apply. When the Yes button 934 is selected and the game apparatus 3 having the player's name "Sato" that corresponds to the "host" inputs information for accepting the application, the game apparatus 3 having the player's name "Sasaki" is allowed to participate in the chat held in the group 1.

Figure 18:
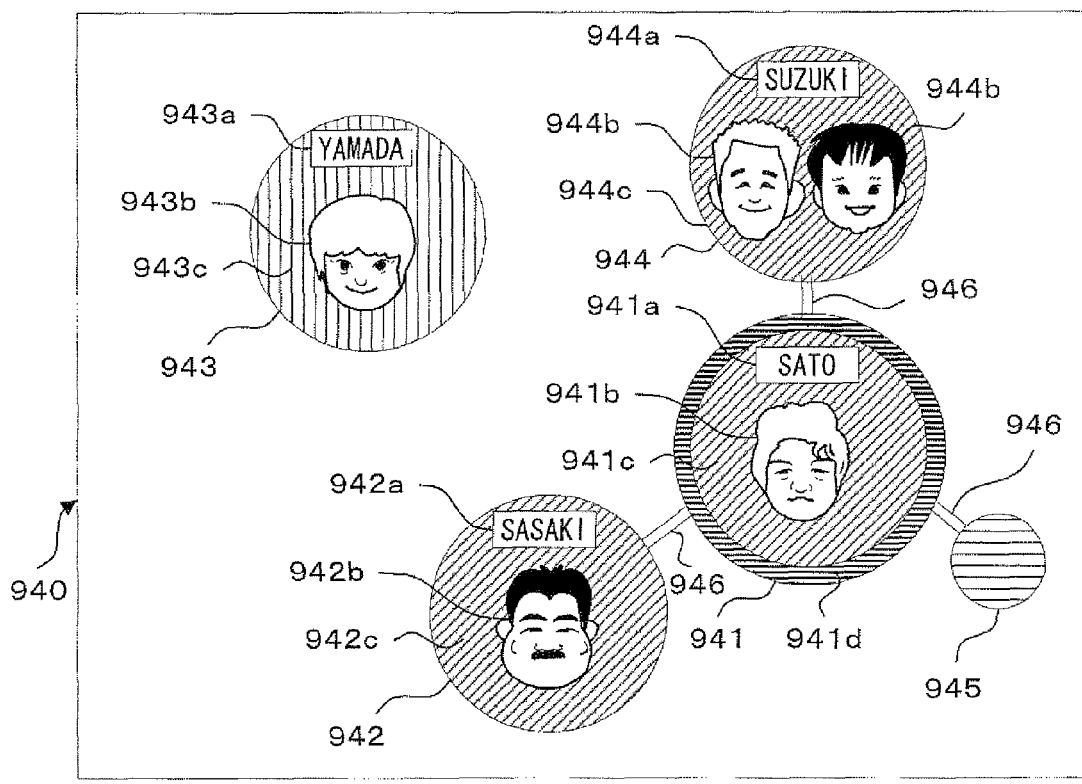
FIG. 18 is a screen diagram showing an example of a communication state display screen displayed on the TV connected to the game apparatus having the player's name "Yamada", in the case where the game apparatus 3 having the player's name "Sasaki" participates in the chat held in the group 1.

FIG. 18 is a screen diagram showing an example of a communication state display screen displayed on the TV 2 connected to the game apparatus 3A having the player's name "Yamada", in the case where the game apparatus 3 having the player's name "Sasaki" has participated in the chat held in the group 1. Referring to FIG. 18, in comparison to the communication state display screen 910 shown in FIG. 15, the vacancy mark 915 displayed to the bottom left of the friend display section 911 that displays the information about the game apparatus 3 having the player's name "Sato" in FIG. 15 is replaced by a friend display section 942 that displays the information about the game apparatus 3 having the player's name "Sasaki". That is, it is understood that the game apparatus 3 having the player's name "Sasaki" has participated in the chat held in the group 1 including the game apparatus 3 having the player's name "Sato" and the game apparatus 3 having the player's name "Suzuki", and as shown in (d) of FIG. 14, the group 1 has become a group of three game apparatuses 3.

Figure 19:
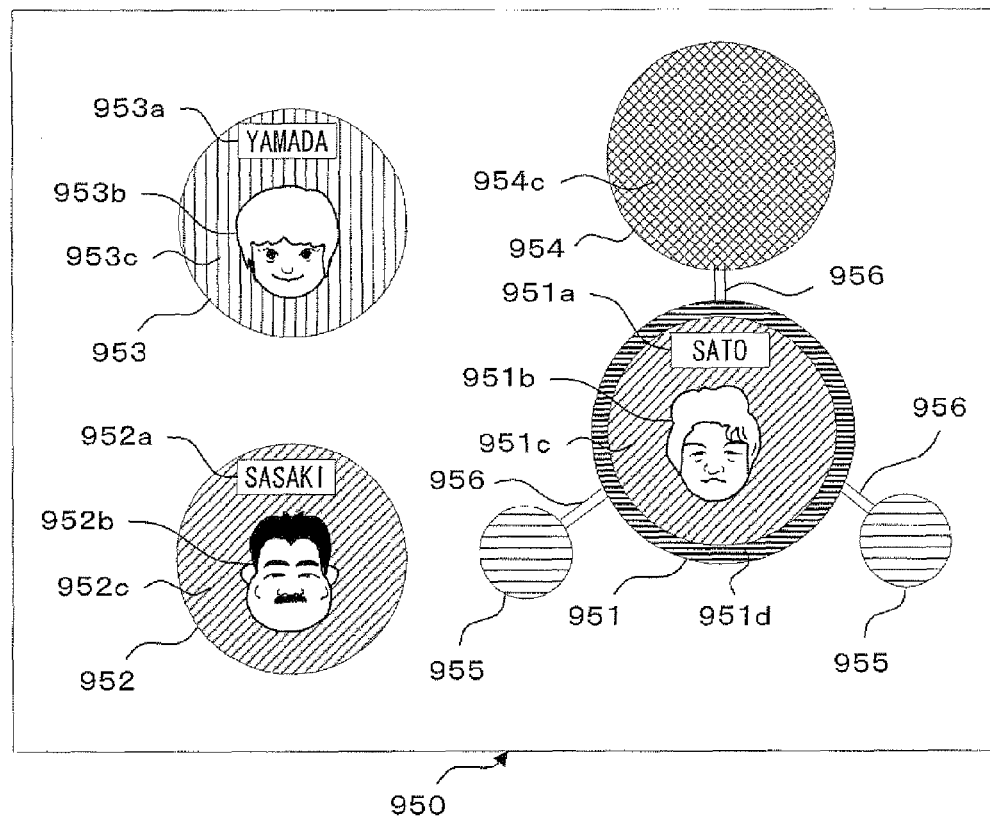
FIG. 19 is a screen diagram showing an example of a communication state display screen displayed on the TV connected to the game apparatus having the player's name "Yamada", in the case where the game apparatus 3 having the player's name "Suzuki" is not registered as a friend in the game apparatus having the player's name "Yamada"

FIG. 19 is a screen diagram showing an example of a communication state display screen displayed on the TV 2 connected to the game apparatus 3A having the player's name "Yamada", in the case where the game apparatus 3 having the player's name "Suzuki" is not registered as a friend in the game apparatus 3A having the player's name "Yamada". When the game apparatus 3 having the player's name "Suzuki" is not registered as a friend in the game apparatus 3A having the player's name "Yamada", the storage determination section 106 determines that the game apparatus 3 having the player's name "Suzuki" is not registered as a friend of the game apparatus 3A. Then the first prohibition section 107 prohibits the user information about the game apparatus 3 operated by the user using the player's name "Suzuki" or the like from being displayed in the game apparatus 3A. At the position (i.e., the display position of a friend display section 954) corresponding to the friend display section 914 that displays the information about the game apparatus 3 having the player's name "Suzuki" in FIG. 15, user information such as a player's name or a face image is not displayed. Note that in the present embodiment the first prohibition section 107 prohibits, when a game apparatus is not registered in advance as a friend, the received user information about the game apparatus and the like from being displayed; however, for example, only the apparatus ID of a game apparatus not registered in advance as a friend may be received.

When the game apparatus 3 having the player's name "Suzuki" is not registered as a friend in the game apparatus 3A having the player's name "Yamada", the game apparatus 3 operated by the user using the player's name "Suzuki" is a friend of a friend (i.e., the game apparatus 3 having the player's name "Sasaki") of the game apparatus 3A having the player's name "Yamada". In response, an attribute display section 954c of the friend display section 954 that corresponds to the game apparatus 3 operated by the user using the player's name "Suzuki" is displayed in yellow green (displayed with grid shading of two types of diagonal lines, in a screen diagram shown in FIG. 19).

Figure 20:
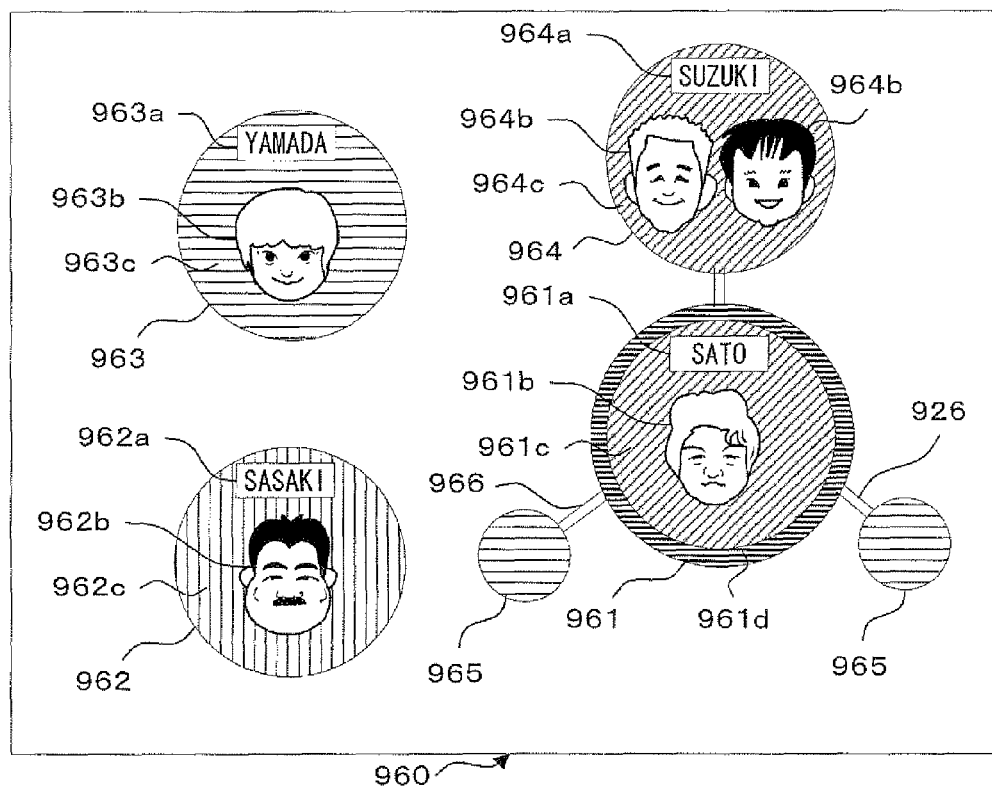
FIG. 20 is a screen diagram showing an example of a communication state display screen displayed on the TV connected to the game apparatus having the player's name "Sasaki", in the case where the game apparatus having the player's name "Yamada" has become offline.

FIG. 20 is a screen diagram showing an example of a communication state display screen displayed on the TV 2 connected to the game apparatus 3 having the player's name "Sasaki", in the case where the game apparatus 3A having the player's name "Yamada" has become offline. When the game apparatus 3A having the player's name "Yamada" has become offline, an attribute display section 963c of the friend display section 963 that corresponds to the game apparatus 3A having the player's name "Yamada" is displayed in gray (displayed with horizontal line shading, in screen diagrams shown in FIGS. 15 through 20), which represent that the corresponding apparatus is offline.

FIG. 21 is tables illustrating an example of a method of an informability determination made by the informing determination section 110 of the game apparatus 3A. (a) of FIG. 21 is a table showing an example of registration information about friends and stored in the informability storage section 172 of the game apparatus 3A having the player's name "Yamada". (b) of FIG. 21 is a table showing an example of registration information about friends and stored in the informability storage section 172 of the game apparatus 3 having the player's name "Sasaki". (c) of FIG. 21 is a table showing an example of the result of the informability determination that has been made by the informing determination section 110 in the present embodiment.

In the present embodiment, as shown in (c) of FIG. 21, when in the game apparatus 3 (the apparatus ID=2222) having the player's name "Sasaki", the piece of informability information about the game apparatus 3A (the apparatus ID=3333) having the player's name "Yamada" is information indicating "informable", the informing determination section 110 of the game apparatus 3A determines that it is permitted to inform the game apparatus 3A (the apparatus ID=3333), having the player's name "Yamada", of the communication state of the game apparatus 3 (the apparatus ID=2222) having the player's name "Sasaki". On the other hand, when in the game apparatus 3 (the apparatus ID=2222) having the player's name "Sasaki", the piece of informability information about the game apparatus 3A (the apparatus ID=3333) having the player's name "Yamada" is information indicating "uninformable", the informing determination section 110 of the game apparatus 3A determines that it is not permitted to inform the game apparatus 3A (the apparatus ID=3333), having the player's name "Yamada", of the communication state of the game apparatus 3 (the apparatus ID=2222) having the player's name "Sasaki".

In addition, the informing determination section 110 of the game apparatus 3A may also make an informability determination as shown in (d) of FIG. 21. That is, only when in the game apparatus 3 (the apparatus ID=2222) having the player's name "Sasaki", the piece of informability information about the game apparatus 3A (the apparatus ID=3333) having the player's name "Yamada" is information indicating "informable", and also in the game apparatus 3A (the apparatus ID=3333) having the player's name "Yamada", the piece of informability information about the game apparatus 3 (the apparatus ID=2222) having the player's name "Sasaki" is information indicating "informable", it is determined that it is permitted to inform the game apparatus 3A (the apparatus ID=3333) having the player's name "Yamada", of the communication state of the game apparatus 3 (the apparatus ID=2222) having the player's name "Sasaki". In this case, a communication state is informed of only when it is set in each apparatus that it is permitted to inform the other apparatus of the communication state of said each apparatus, and therefore it is possible to protect privacy with more certainty.

Note that the display control device according to the present invention is not limited to the game apparatus 3 according to the above embodiment, and may have the following structures.

(A) In the present embodiment a case is described where the CPU 10 functionally includes the connection determination section 101, the communication partner acquisition section 102, the first acquisition section 103, the communication state display section 104, the second acquisition section 105, the storage determination section 106, the first prohibition section 107, the number-of-apparatuses determination section 108, the communicability display section 109, the informing determination section 110, the second prohibition section 111, the informability setting section 112, and the like; however, at least one functional section of the connection determination section 101, the communication partner acquisition section 102, the first acquisition section 103, the communication state display section 104, the second acquisition section 105, the storage determination section 106, the first prohibition section 107, the number-of-apparatuses determination section 108, the communicability display section 109, the informing determination section 110, the second prohibition section 111, and the informability setting section 112 may be configured with hardware such as an electric circuit.

(B) In the present embodiment a case is described where the CPU 10 includes the first prohibition section 107 and the second prohibition section 111; however, the CPU 10 may include at least either the first prohibition section 107 or the second prohibition section 111.

(C) In the present embodiment a case is described where a piece of distinguishing information is name information and face image information; however, it is only necessary that a piece of distinguishing Information include at least either name information or face image information. Alternatively, when at least either the first prohibition section 107 or the second prohibition section 111 prohibits a piece of distinguishing information from being displayed, the communication state display section 104 may display, instead of the piece of distinguishing information, information such as an initial, with which it is difficult to specify an individual, or a face image formed only of a facial outline. In this case, the user can easily decide whether or not to participate in a chat or the like, while protecting privacy.

The present invention can be applied to a computer-readable storage medium having a display control program stored therein, a display control device, and a display control system. Particularly, the present invention can be applied to a computer-readable storage medium having stored therein a display control program that displays, in a first computer included in a plurality of computers on a network, the communication states of the plurality of computers, a display control device, and a display control system.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium with an executable display control program stored therein, the display control program instructing a first computer included in a plurality of computers on a network, to display communication states of the plurality of computers, the display control program comprising executable instructions that instruct the first computer to perform:

registration information storage including storing pieces of individual information about computers that are registered as communication partners, which are partners with which the first computer communicates via the network, and pieces of distinguishing information, about the computers, associated with the pieces of individual information;

connection determining including determining whether or not a second computer, which is a computer that corresponds to at least one of the pieces of individual information stored by the registration information storage, is connected to the network;

first acquisition including acquiring, when the connection determining has determined that the second computer is connected to the network, a piece of individual information about a third computer that is communicating with the second computer; and communication state display including visibly displaying before the first computer communicates with the second computer or the third computer, based on the piece of individual information about the third computer acquired by the first acquisition and the piece of individual information about the second computer, state of communication of the second computer with the third computer, and for also displaying information about the second computer, based on a piece of distinguishing information about the second computer, so as to be distinguishable from other computers.

2. The computer-readable storage medium having stored therein the display control program according to claim 1, wherein:

the display control program further instructs the first computer to perform:

second acquisition including acquiring a piece of distinguishing information about the third computer based on the piece of individual information about the third computer; and wherein the communication state display further displays information about the third computer, based on the piece of distinguishing information about the third computer, so as to be distinguishable.

3. The computer-readable storage medium having stored therein the display control program according to claim 1, wherein:

the display control program further instructs the first computer to perform:

second acquisition including acquiring a piece of distinguishing information about the third computer based on the piece of individual information about the third computer, and storage determination including determining whether or not the piece of individual information about the third computer is stored in the registration information storage; and only when the storage determination has determined that the piece of individual information about the third computer is stored in the registration information storage, the communication state display displays information about the third computer, based on the piece of distinguishing information about the third computer, so as to be distinguishable.

4. The computer-readable storage medium having stored therein the display control program according to claim 1, wherein the display control program further instructs the first computer to perform:

number-of-computers determination including determining whether or not the number of computers that are communicating with the second computer is equal to or smaller than a predetermined number; and communicability display including, when the number-of-computers determination has determined that the number of computers is equal to or smaller than a predetermined number, visibly displaying that it is possible to communicate with the second computer.

5. The computer-readable storage medium having stored therein the display control program according to claim 4, wherein, when the number-of-computers determination has determined that the number of computers is equal to or smaller than a predetermined number, the communicability display visibly displays the number of computers that can communicate with the second computer.

6. The computer-readable storage medium having stored therein the display control program according to claim 1, wherein:

the display control program further instructs the first computer to perform:

second acquisition including acquiring a piece of distinguishing information about the third computer based on the piece of individual information about the third computer, and informing determination including, when the connection determination has determined that the second computer is connected to the network, determining whether or not it is permitted, in the second computer, to inform the first computer of the piece of distinguishing information about the third computer; and only when the informing determination has determined that it is permitted to inform the first computer, the communication state display displays information about the third computer, based on the piece of distinguishing information about the third computer, so as to be distinguishable.

7. The computer-readable storage medium having stored therein the display control program according to claim 6, wherein the display control program further instructs the first computer to perform:

informability storage including storing each of the pieces of individual information stored in the registration information storage, in association with a piece of informability information indicating whether or not it is permitted to inform another computer, which corresponds to said each of the pieces of individual information, of a piece of distinguishing information about yet another computer that is communicating with the first computer.

8. The computer-readable storage medium having stored therein the display control program according to claim 7, wherein the display control program further instructs the first computer to perform:

informability setting including receiving an external operation input, setting, based on the received operation input, the piece of informability information with respect to each of the pieces of individual information stored in the registration information storage, and storing the set piece of informability information in the informability storage.

9. The computer-readable storage medium having stored therein the display control program according to claim 6, wherein:

the second computer is configured to store therein a piece of informability information indicating whether or not it is permitted to inform the first computer of the piece of distinguishing information about the third computer; and the informing determination acquires the piece of informability information from the second computer and determines, based on the piece of informability information, whether or not it is permitted to inform the first computer of the piece of distinguishing information about the third computer.

10. The computer-readable storage medium having stored therein the display control program according to claim 1, wherein the pieces of individual information are pieces of ID information assigned in advance to the plurality of computers.

11. The computer-readable storage medium having stored therein the display control program according to claim 1, wherein each of the pieces of distinguishing information includes at least either name information or face image information that is an image representing a person's face.

12. The computer-readable storage medium having stored therein the display control program according to claim 1, wherein
the plurality of computers are connected to each other so as to communicate externally input voice information to each other providing voice chat between the plurality of computers.

13. The computer-readable storage medium having stored therein the display control program according to claim 1, wherein
the plurality of computers are connected to each other so as to communicate externally input character information to each other.

14. The computer-readable storage medium having stored therein the display control program according to claim 1, wherein
the plurality of computers are connected to each other so as to communicate externally input operation input information to each other, and so as also to communicate game information about a game executed based on the operation input information to each other.

15. A display control device for displaying, in a first computer included in a plurality of computers on a network, communication states of the plurality of computers, the display control device comprising:
a registration information storage configured to store therein pieces of individual information about computers that are registered as communication partners, which are partners with which the first computer communicates via the network, and pieces of distinguishing information, about the computers, associated with the pieces of individual information;
a connection determiner configured to determine whether or not a second computer, which is a computer that corresponds to at least one of the pieces of individual information stored in the registration information storage, is connected to the network;
a first acquisition structure configured to, when the connection determiner has determined that the second computer is connected to the network, acquire a piece of individual information about a third computer that is communicating with the second computer; and
a communication state display configured to visibly display before the first computer communicates with the second computer or the third computer, based on the piece of individual information about the third computer acquired by the first acquisition structure and the piece of individual information about the second computer, state of communication of the second computer with the third computer, and for also displaying information about the second computer, based on a piece of distinguishing information about the second computer, so as to be distinguishable from other computers.

16. A display control system, provided with a plurality of computers and a server on a network, for displaying, in a first computer included in the plurality of computers, communication states of the plurality of computers:
the server comprising
communication partner storage configured to store therein a piece of individual information about each of the plurality of computers in association with pieces of individual information about others of the plurality of computers that are communicating with each of the plurality of computers; and
the first computer comprising
registration information storage configured to store therein pieces of individual information about computers that are registered as communication partners, which are partners with which the first computer communicates via the network, and pieces of distinguishing information, about the computers, associated with the pieces of individual information,
a connection determiner configured to determine whether or not a second computer, which is a computer that corresponds to at least one of the pieces of individual information stored in the registration information storage, is connected to the network,
a first acquisition structure that is configured so that, when the connection determination determiner has determined that the second computer is connected to the network, the first acquisition structure acquires a piece of individual information, stored in the communication partner storage of the server, about a third computer that is communicating with the second computer, and
a communication state display configured to visibly display before the first computer communicates with the second computer or the third computer, based on the piece of individual information about the third computer acquired by the first acquisition structure and the piece of individual information about the second computer, state of communication of the second computer with the third computer, and for also displaying information about the second computer, based on a piece of distinguishing information about the second computer, so as to be distinguishable from other computers.

17. A method for use with a first computer included in a plurality of computers on a network, the method comprising:
storing, with the first computer, pieces of individual information about computers that are registered as communication partners, which are partners with which the first computer communicates via the network, and pieces of distinguishing information, about the computers, associated with the pieces of individual information;
determining whether or not a second computer, which is a computer that corresponds to at least one of the pieces of individual information stored in the registration information storage means, is connected to the network;
acquiring, when the connection determining has determined that the second computer is connected to the network, a piece of individual information about a third computer that is communicating with the second computer; and
before the first computer communicates with the second computer or the third computer, visibly displaying, based on the piece of individual information about the third computer acquired by the acquiring and the piece of individual information about the second computer, state of communication of the second computer with the third computer, and for also displaying information about the second computer, based on a piece of distinguishing information about the second computer, so as to be distinguishable from other computers.

18. A non-transitory computer-readable storage medium having stored therein a display control program, the program when executed by display a first computer included in a plurality of computers on a network, control the first computer to display communication states of the plurality of computers, the display control program comprising instructions that cause the first computer to:
store therein pieces of individual information about computers that are registered as communication partners, which are partners with which the first computer communicates via the network, and pieces of distinguishing information, about the computers, associated with the pieces of individual information;

determining whether or not a second computer, which is a computer that corresponds to at least one of the stored pieces of individual information is connected to the network;

acquiring, when the connection determining has determined that the second computer is connected to the network, a piece of individual information about a third computer that is communicating with the second computer; and before the first computer participates in a group communication with the second computer and the third computer, visibly displaying, based on the piece of individual information about the third computer acquired by the acquiring and the piece of individual information about the second computer, states of communication between the second computer and the third computer.

19. The storage medium of claim 18 wherein the visibly displayed communication states comprises displaying a graphical indicator that the second and third computers are actively communicating with one another.

20. The storage medium of claim 18 wherein the visibly displayed communication states comprises displaying a graphical indicator that the second and third computers are actively engaged in a voice chat.

* * * * *